United States Patent
Seghizzi et al.

(10) Patent No.: US 12,368,354 B2
(45) Date of Patent: Jul. 22, 2025

(54) METHOD OF MANUFACTURING A STATOR FOR AN ELECTRIC MOTOR, STATOR, AND ELECTRIC MOTOR

(71) Applicant: STMICROELECTRONICS S.r.l., Agrate Brianza (IT)

(72) Inventors: Luca Seghizzi, Milan (IT); Federico Vercesi, Milan (IT); Gianluca Longoni, Cernusco sul Naviglio (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 131 days.

(21) Appl. No.: 18/345,863

(22) Filed: Jun. 30, 2023

(65) Prior Publication Data
US 2024/0014718 A1 Jan. 11, 2024

(30) Foreign Application Priority Data
Jul. 8, 2022 (IT) .................. 102022000014485

(51) Int. Cl.
*H01F 41/04* (2006.01)
*H02K 1/14* (2006.01)
(Continued)

(52) U.S. Cl.
CPC .......... *H02K 15/026* (2013.01); *H02K 15/33* (2025.01); *H02K 2215/00* (2021.08)

(58) Field of Classification Search
CPC ........ H02K 3/26; H02K 15/02; H02K 15/026; H02K 15/0068; H02K 2215/00;
(Continued)

(56) References Cited

U.S. PATENT DOCUMENTS 5,936,298 A * 8/1999 Capocelli ............ H01F 17/0033
257/758
6,990,729 B2 * 1/2006 Pleskach ........... H01L 23/49822
336/200
(Continued)

FOREIGN PATENT DOCUMENTS

CH 1276772 A4 10/1974
EP 0725407 A1 8/1996

OTHER PUBLICATIONS

Han et al., "Micro Electromagnetic Flat Motor Using an 80-Poles 1 and 0.3-Mm-Thick Ring Magnet for High Torque," IEEE MEMS 2020, Vancouver, Canada, Jan. 18-22, 2020, pp. 509-512.
(Continued)

*Primary Examiner* — Burton S Mullins
(74) *Attorney, Agent, or Firm* — Seed IP Law Group LLP

(57) ABSTRACT

A stator for an electric actuator or motor, including: a solid body; a ferromagnetic core region between the layers of semiconductor material, electrically insulated from the layers of semiconductor material; a plurality of conductive through vias through the solid body; a first plurality of conductive strips, which extend parallel to one another above the core; and a second plurality of conductive strips, which extend parallel to one another above the core and opposite to the first plurality of conductive strips; wherein the first plurality of conductive strips, the plurality of conductive through vias, and the second plurality of conductive strips form a winding or coil of the stator.

20 Claims, 16 Drawing Sheets

(51) Int. Cl.
  *H02K 3/26* (2006.01)
  *H02K 15/026* (2025.01)
  *H02K 15/33* (2025.01)
(58) Field of Classification Search
  CPC ........ H02K 15/33; H10D 88/00; H10D 88/01; H01F 41/041; H01F 41/046; H01F 2017/0086
  USPC .......................................................... 438/3
  See application file for complete search history.

(56) References Cited

U.S. PATENT DOCUMENTS

| | | | |
|---|---|---|---|
| 7,666,688 B2 * | 2/2010 | Ching | H01F 41/046 257/E21.022 |
| 8,697,574 B2 * | 4/2014 | Mackh | H01L 23/5227 438/668 |
| 2007/0126300 A1 | 6/2007 | Greywall | |
| 2008/0252407 A1 * | 10/2008 | Anderson | H01L 23/5227 257/E21.022 |

OTHER PUBLICATIONS

Zhang et al., "Radial magnetic beatings: An overview," *Results in Physics* 7:3756-3766, 2017.

* cited by examiner

METHOD OF MANUFACTURING A STATOR FOR AN ELECTRIC MOTOR, STATOR, AND ELECTRIC MOTOR

BACKGROUND

Technical Field

The present disclosure relates to a method of manufacturing a component, in particular a stator, for an electric or electromagnetic actuator or motor, such as a stator for a three-phase asynchronous electric motor.

Description of the Related Art

As is known, a three-phase asynchronous motor is supplied by a system of three-phase voltages, i.e., three voltages that are phase-shifted by 120° with respect to one another. Structurally, a three-phase motor is constituted by a fixed part (stator), which carries three windings, the axes of which are arranged at 120° with respect to one another, and by a mobile part (rotor) arranged at the center of the stator windings, which carries an electrical circuit closed on itself. The stator may alternatively, envisage six windings shifted by 60° with respect to one another. Present between the stator and the rotor is a gap of air or dielectric, to enable free rotation of the rotor.

The stator coils are supplied, as has been said, by a three-phase system of voltages, which cause generation of a variable magnetic field by each coil. In the area between the three coils the magnetic field is the sum of the magnetic fields of the coils. As a result of the mutual arrangement of the coils and of the three-phase system of voltages that supply the windings, the resulting magnetic field is not fixed but is variable; this magnetic field rotates about the axis of the motor at a pre-set frequency (equal to the frequency of the currents).

On account of the magnetic flux that concatenates with the rotor windings an induced electromotive force is set up, which opposes the cause that has generated it.

On account of miniaturization of the components utilized for the development of micro-robots or micro-actuators, there is felt the need to miniaturize the components of a three-phase electric motor. In particular, an effort is undertaken for miniaturizing the stator components, which include the coils.

BRIEF SUMMARY

One embodiment is a method of manufacturing a stator for an electric actuator or motor, a stator, and an electric actuator or motor that are designed to overcome the drawbacks of the prior art.

According to the present disclosure, a method of manufacturing a stator for an electric actuator or motor, a stator, and an electric actuator or motor are provided.

In one embodiment, a method of manufacturing a stator for an electrical actuator includes providing a first body including a first semiconductor layer, a first structural layer on a first side of the first semiconductor layer, and a second structural layer on a second side, opposite to the first side, of the first semiconductor layer. The first and second structural layers are made of a material that is selectively removable with respect to a material of the first semiconductor layer. The method includes forming, on the first structural layer, a ferromagnetic core region, covering the core region with a protective dielectric layer, and providing a second body including a second semiconductor layer on a third structural layer, wherein the third structural layer is made of a material that is selectively removable with respect to a material of the second semiconductor layer. The method includes coupling the second semiconductor layer of the second body to the protective dielectric layer, forming a plurality of conductive through vias through the first and second semiconductor layers and through the first and third structural layers, and forming, on the third structural layer in a position corresponding to and above a first side of the core region, a first plurality of conductive strips parallel to one another and in electrical contact with the plurality of conductive through vias. The method includes coupling a first protective cap at the third structural layer, the first protective cap having a cavity designed to house the first plurality of conductive strips and forming, on the second structural layer in a position corresponding to and above a second side, opposite to the first side, of the core region, a second plurality of conductive strips parallel to one another and in electrical contact with the plurality of conductive through vias by conductive paths through the second structural layer. The method includes coupling a second protective cap to the second structural layer, the second protective cap having a respective cavity designed to house the second plurality of conductive strips, etching a selective portion of the second protective cap extending laterally with respect to the first and second pluralities of conductive strips to form a through opening passing through the second protective cap, and forming a hole through the first and second structural bodies by removing selective portions of the first and second bodies that are aligned, in a direction, to the through opening.

In one embodiment, a stator for an electrical actuator includes a solid body including layers of semiconductor material arranged between a first layer of insulating material and a second layer of insulating material, a ferromagnetic core region between the layers of semiconductor material, electrically insulated from the layers of semiconductor material, and a plurality of conductive through vias through the solid body. The stator includes a first plurality of conductive strips on the first layer of insulating material, which extend parallel to one another in positions corresponding to and above a first side of the core region and a second plurality of conductive strips on the second layer of insulating material, which extend parallel to one another in positions corresponding to and above a second side, opposite to the first side, of the core region. The first plurality of conductive strips, the plurality of conductive through vias, and the second plurality of conductive strips are electrically connected together to form a coil wound around the core region. The stator includes a first protective cap coupled to the second layer of insulating material and provided with a cavity that is to house the first plurality of conductive strips, a second protective cap coupled to the first layer of insulating material and provided with a respective cavity that is to house the second plurality of conductive strips, and a hole passing through at least one between the first protective cap and the second protective cap and through the first and second solid bodies, alongside the coil.

BRIEF DESCRIPTION OF THE SEVERAL VIEWS OF THE DRAWINGS

For a better understanding of the present disclosure, preferred embodiments thereof are now described purely by way of non-limiting example, with reference to the attached drawings, wherein.

DETAILED DESCRIPTION

Figure 1:
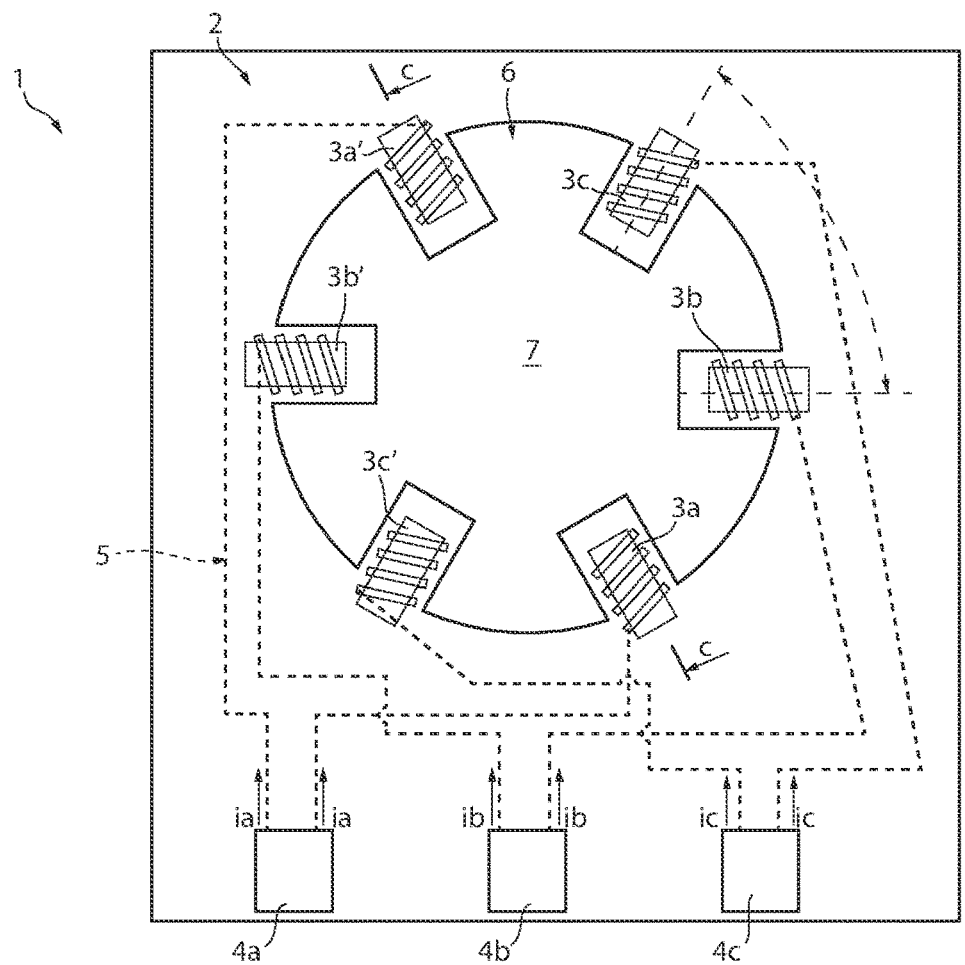
FIG. 1 illustrates, in top plan view, a schematic representation of a stator according to one aspect of the present disclosure.

FIG. 1 is a schematic illustration of a stator 1 for a three-phase asynchronous motor, according to one aspect of the present disclosure. The stator 1 of FIG. 1 is obtained using MEMS technology, in a body 2 including semiconductor material. The stator 1 has coils, or windings, in a number equal to three or a multiple of three. In the example of FIG. 1 six coils 3a, 3b, 3c and 3a', 3b', 3c' are present.

The windings 3a and 3a' are electrically connected to a signal generator 4a (a voltage or current generator), configured to get one and the same current $i_a$ to flow in both of the windings 3a, 3a'.

The windings 3b and 3b' are electrically connected to a signal generator 4b (a voltage or current generator), configured to get one and the same current $i_b$ to flow in both of the windings 3b, 3b'.

The windings 3c and 3c' are electrically connected to a signal generator 4c (a voltage or current generator), configured to get one and the same current $i_c$ to flow in both of the windings 3c, 3c'.

Conductive leads (designated as a whole by the reference number 5) are present for carrying the currents $i_a$-$i_c$ to the windings 3a-3c, 3a'-3c'.

The windings 3a-3c are arranged along a circular path 6 defined through the body 2 and are separated from one another by one and the same angle of 60° Likewise, also the windings 3a'-3c' are arranged along the circular path 6 and are separated from one another by the same angle of 60°. More in particular, the windings 3a and 3a' are aligned along a diameter of the circumference 6 and are thus separated from one another, along the circumference 6, by an angle of 180°. The same applies to the other windings.

The circular path 6 defines a hole through the body 2 and may be a through opening or an opening closed on one side of the body 2. The windings 3a-3c and 3a'-3c' project at least in part from (or are suspended at least in part over) the opening of the circular path 6. The rotor (not illustrated) of the three-phase asynchronous motor may be inserted into the opening of the circular path.

Figure 2:
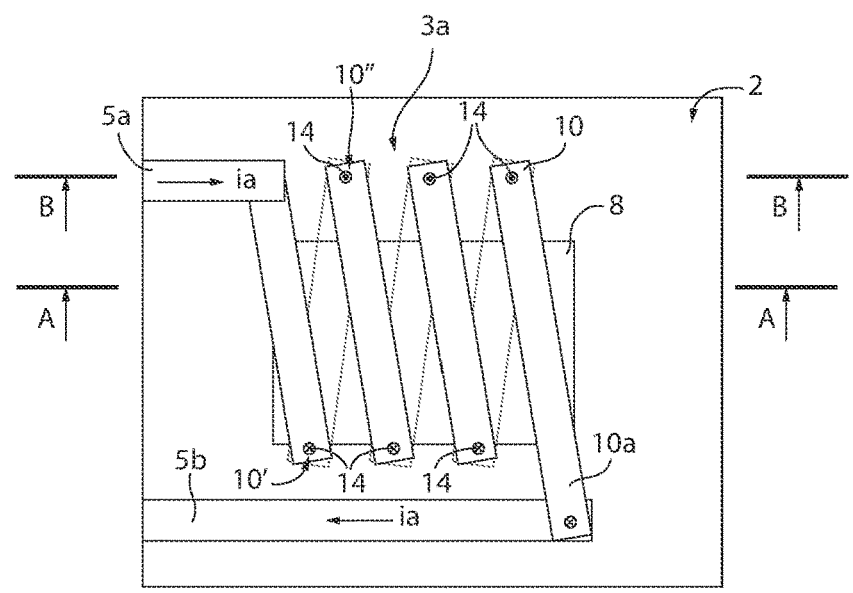
FIG. 2 illustrates, in top plan view, an enlarged detail of a coil of the stator of FIG. 1.

FIG. 2 illustrates, in a cartesian plane of mutually orthogonal axes X, Y, Z, an enlarged view of a coil (for example, the coil 3a), where only some elements useful for an understanding of the present disclosure are represented. In particular, the coil 3a of FIG. 2 has conductive strips 10 (e.g., made of metal, in particular gold), which extend on opposite sides of a core 8 made of ferromagnetic material, for example an alloy of, or including, nickel-iron (NiFe). Mutually coplanar conductive strips 10 (i.e., all those above the core 8 and, respectively, all those underneath the core 8) are parallel to one another and physically separated and electrically insulated (along the axis X) from one another. The number of the coplanar conductive strips 10 is chosen in the stage of design and sizing of the end device to be produced, according, for example, to the desired performance; the greater the number of windings (i.e., of conductive strips), the greater the force produced by the stator thus obtained. By way of non-limiting example, the number of the coplanar conductive strips is between 2 and 100.

To produce the coil 3a, each conductive strip 10 that extends over the core 8 is electrically coupled, at a first end portion 10' thereof, to a conductive strip 10 that extends underneath the core 8 and, at a second end portion 10" thereof opposite to the first end portion 10', to another conductive strip 10 that extends underneath the core 8. In this context, the terms "over" and "underneath" refer to the direction of the axis Z.

To enable supply of the electric current $i_a$ to the coil 3a, two of the conductive strips 10 (in FIG. 2, the first and the last of the series of top coplanar leads) have a respective end portion coupled to a respective conductive strip 10, while the other end portion is coupled to a respective conductive lead 5a, 5b. The conductive lead 5a supplies the current $i_a$ at input to the coil 3a, whereas the conductive lead 5b draws the current leaving the coil 3a. The conductive leads 5a and 5b are respectively connected to opposite terminals (+ and −) of the voltage or current generator 4a. The same applies to the other coils 3b-3c, 3a'-3c'.

The electrical coupling between conductive strips 10 that extend in different planes (i.e., opposite to the core 8) is obtained by conductive through vias 14, which extend, for example, in a direction orthogonal to the plane of lie of the conductive strips 10, in electrical contact with a conductive strip 10 above the core 8 and with a respective conductive strip 10 below the core 8.

Figure 3A:
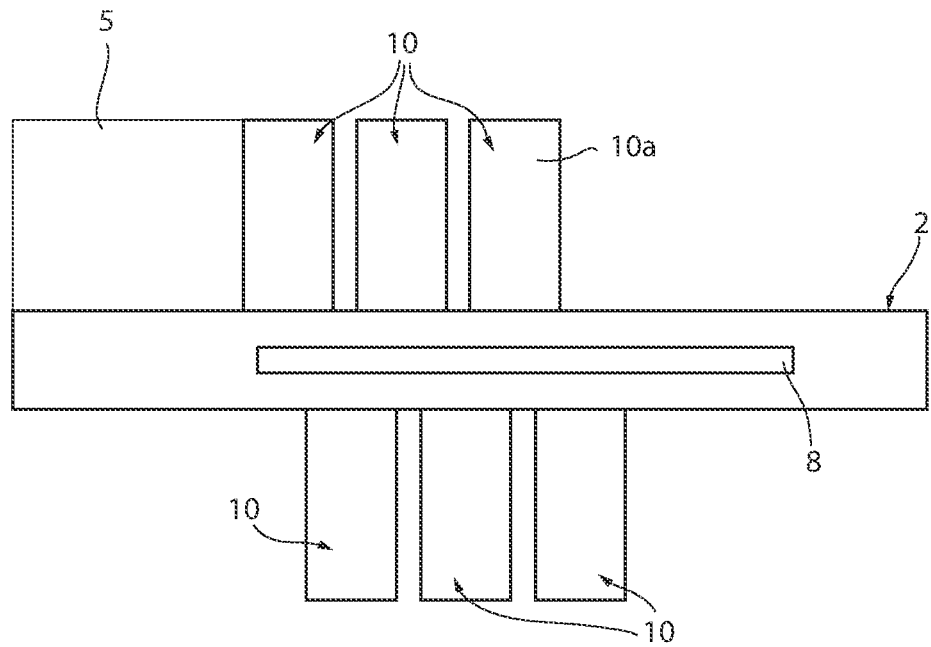
FIGS. 3A and 3B illustrate respective cross-sectional views of the coil of FIG. 2, along the lines of section A-A and B-B, respectively.
Figure 3B:
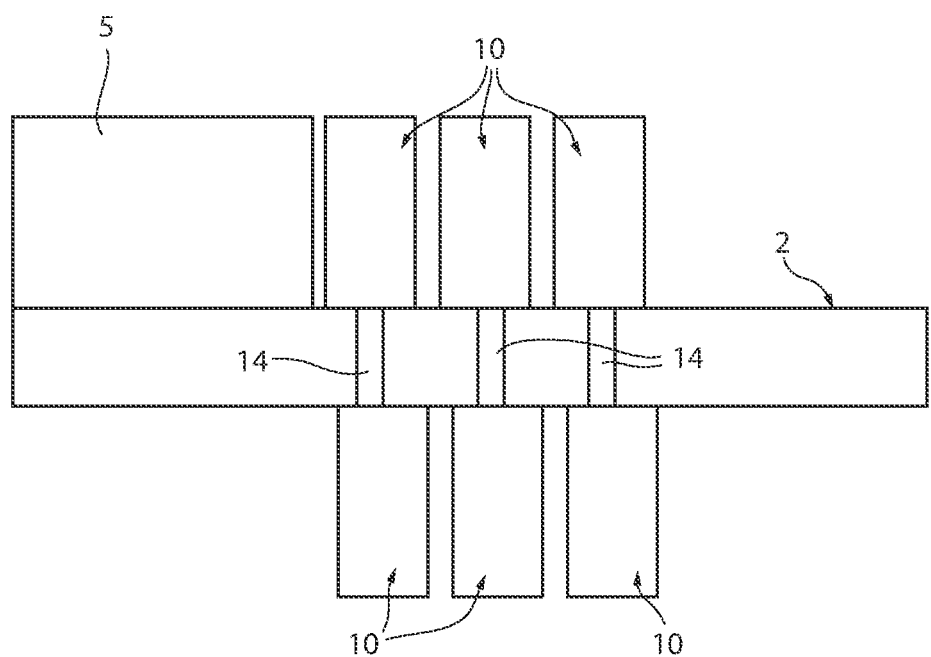

FIG. 3A is a simplified cross-sectional view of the winding 3a of FIG. 2, along the line of section A-A, and FIG. 3B is a simplified cross-sectional view of the winding 3a of FIG. 2, along the line of section B-B.

Figure 4A:
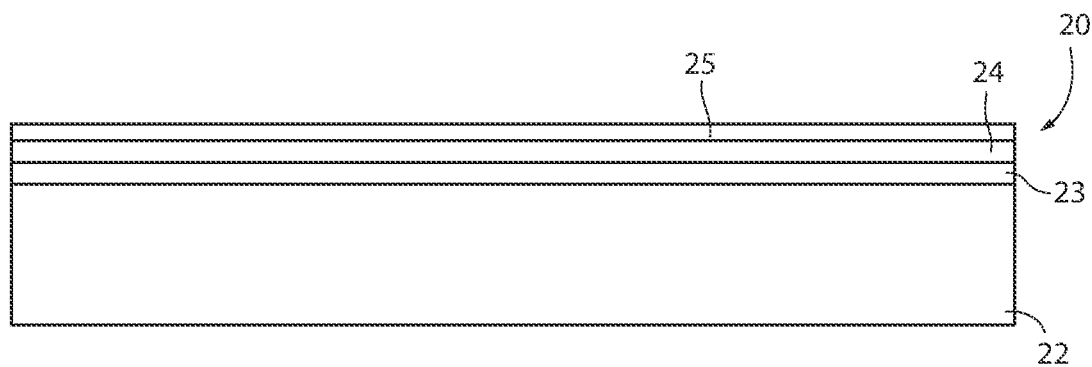
FIGS. 4A-4S illustrate, in cross-sectional view along the line of section C-C of FIG. 1, steps for manufacturing the stator of FIG. 1.
Figure 4B:
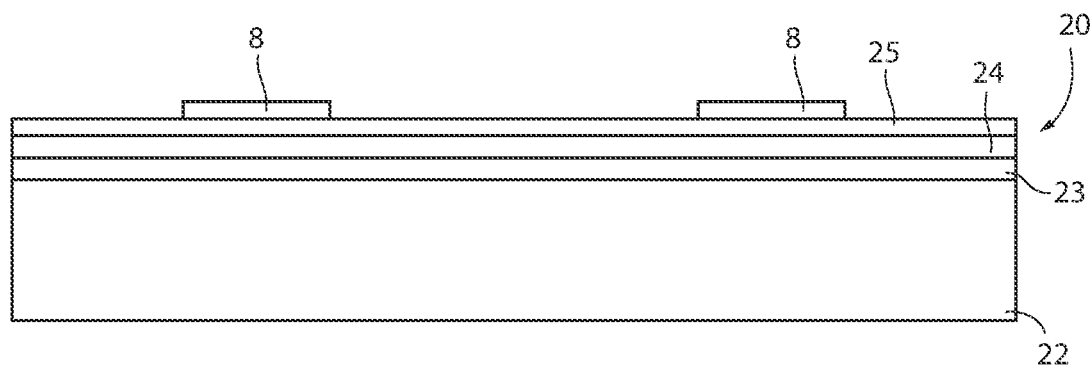
Figure 4C:
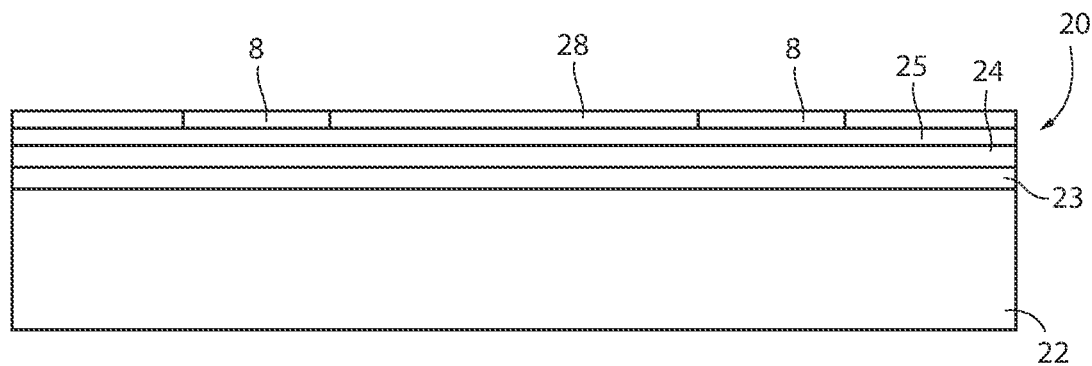
Figure 4D:
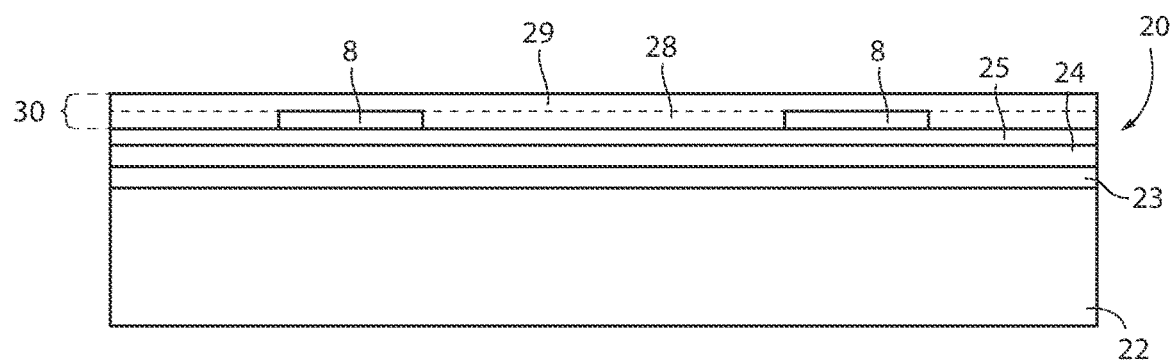
Figure 4E:
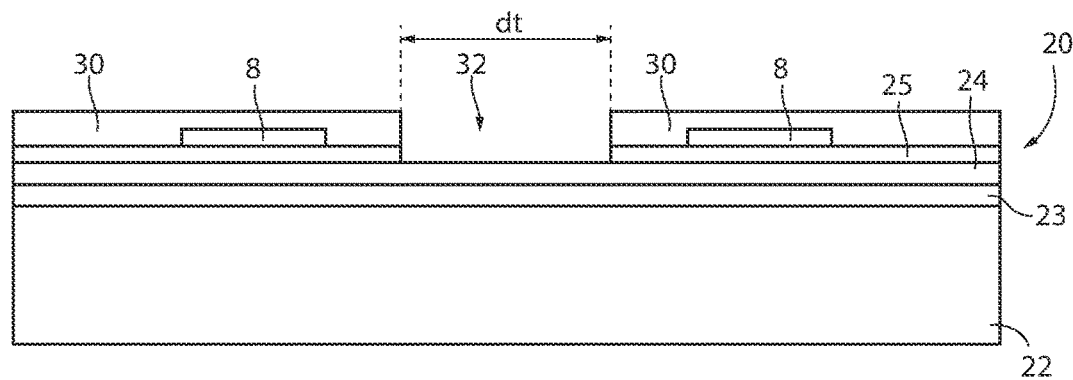
Figure 4F:
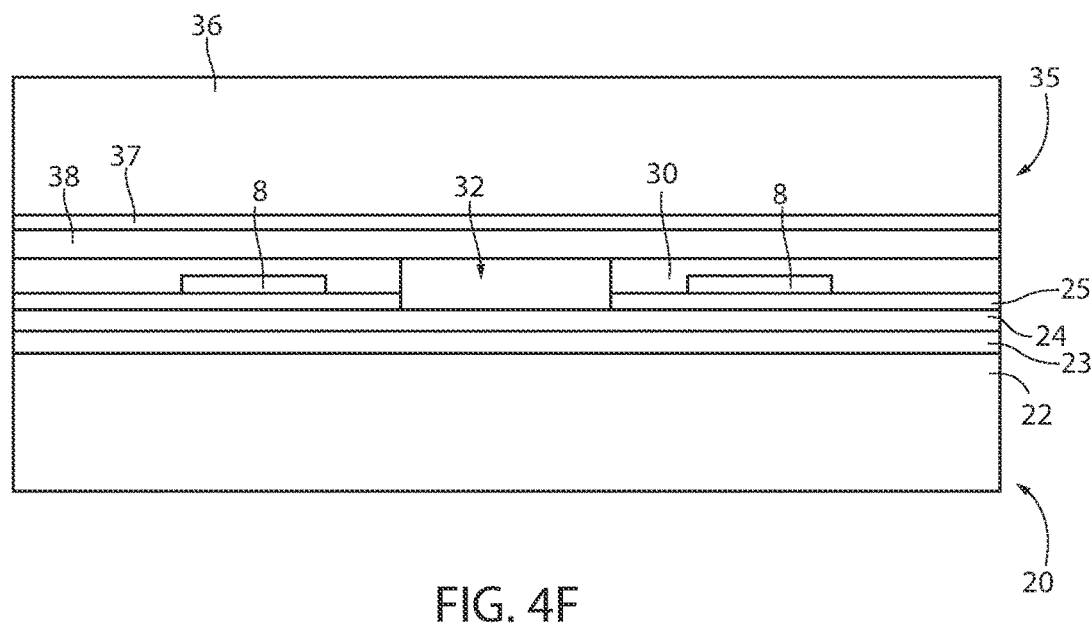
Figure 4G:
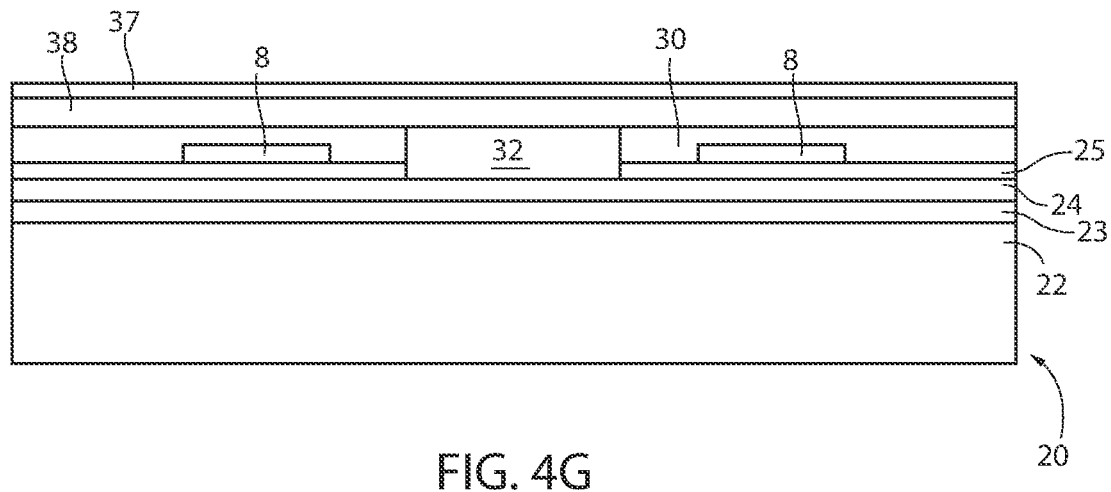
Figure 4H:
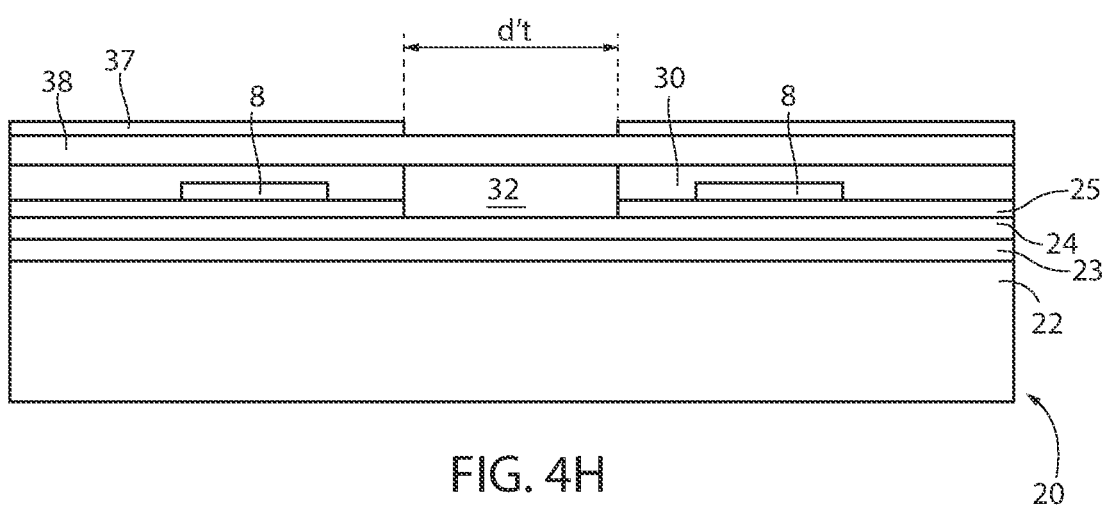
Figure 4I:
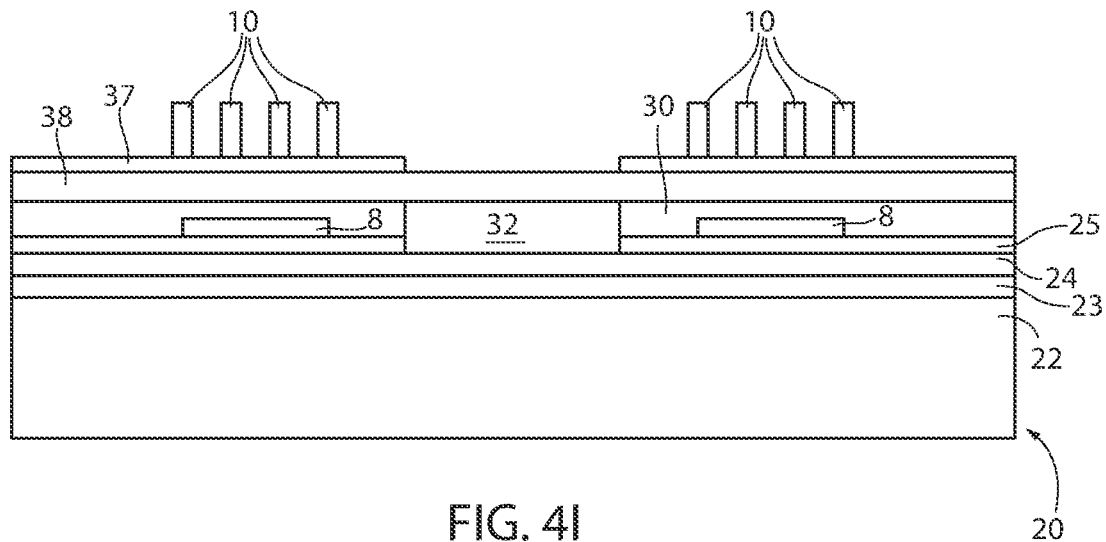
Figure 4L:
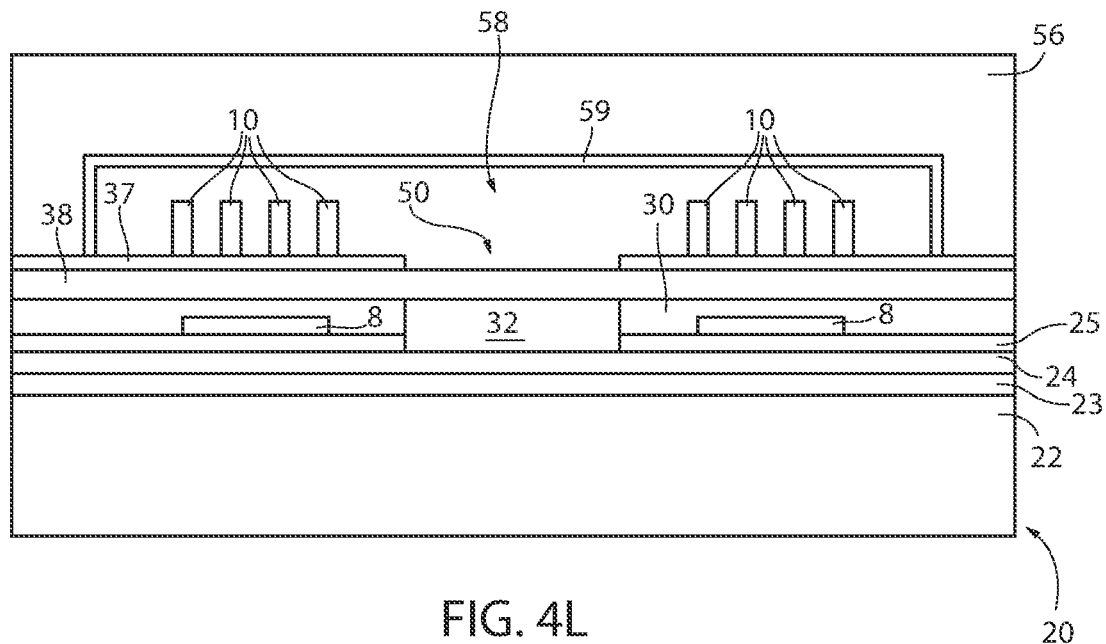
Figure 4M:
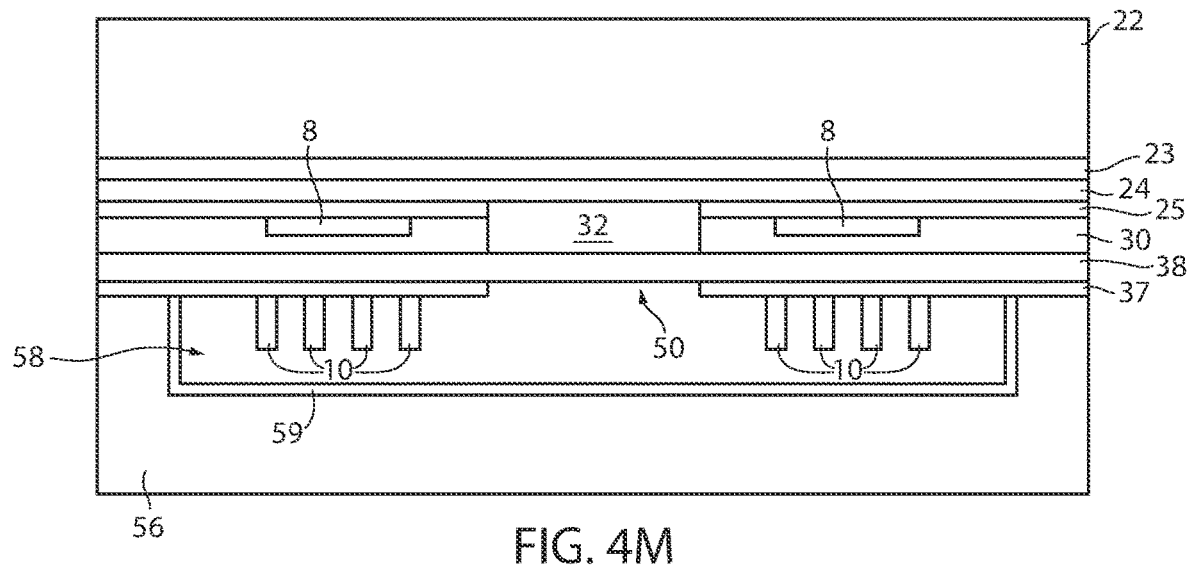
Figure 4N:
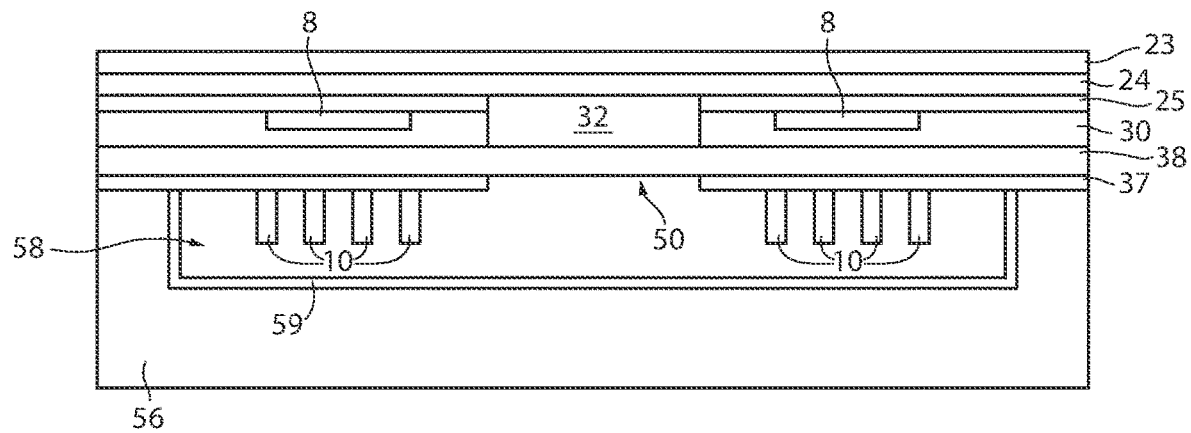
Figure 4O:
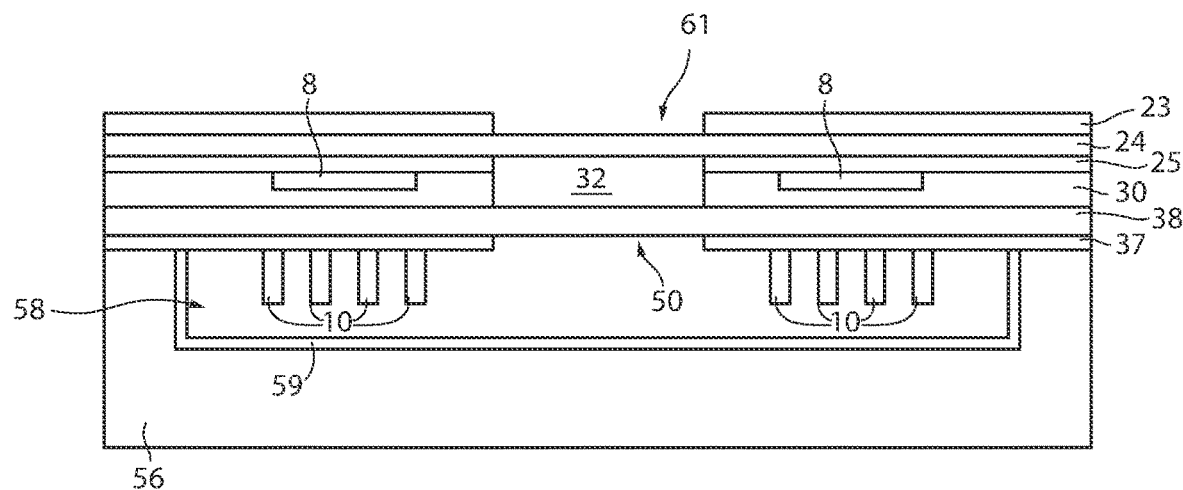
Figure 4P:
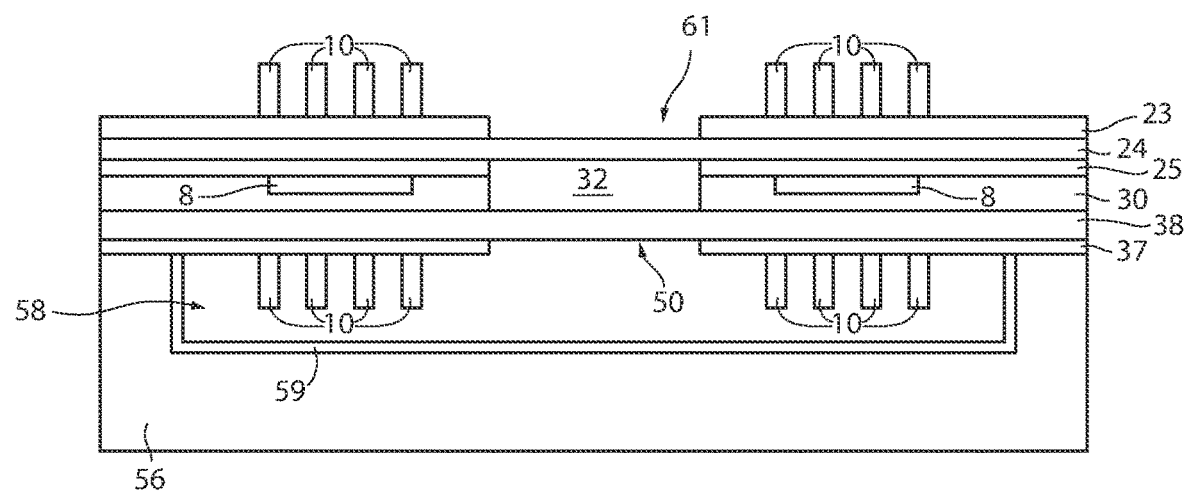
Figure 4Q:
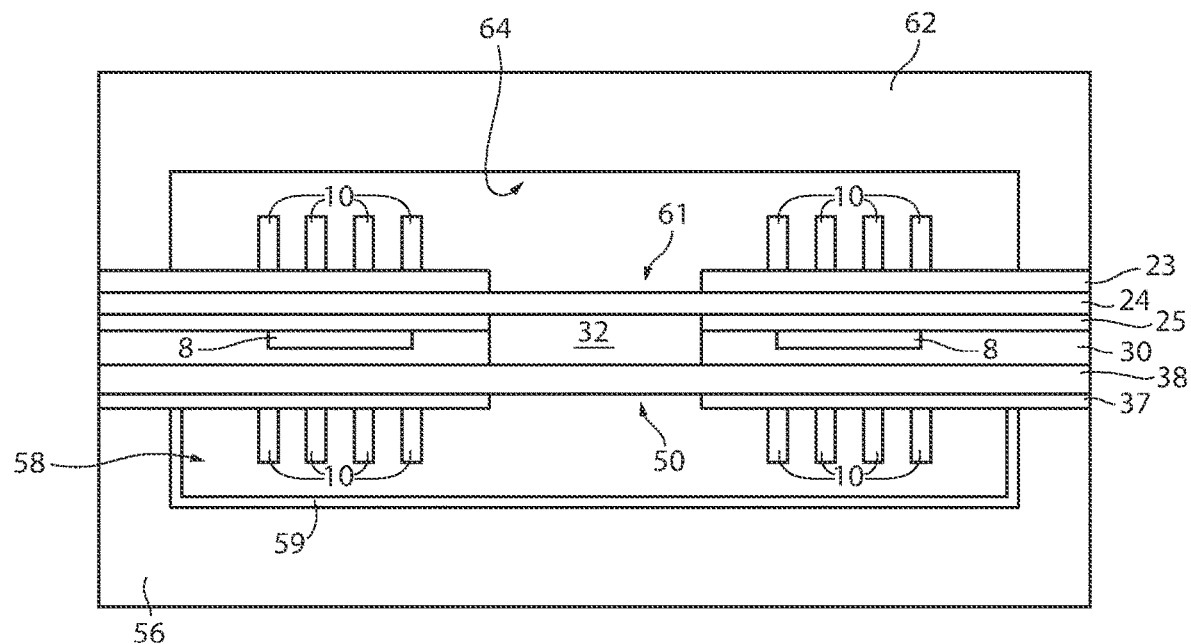
Figure 4R:
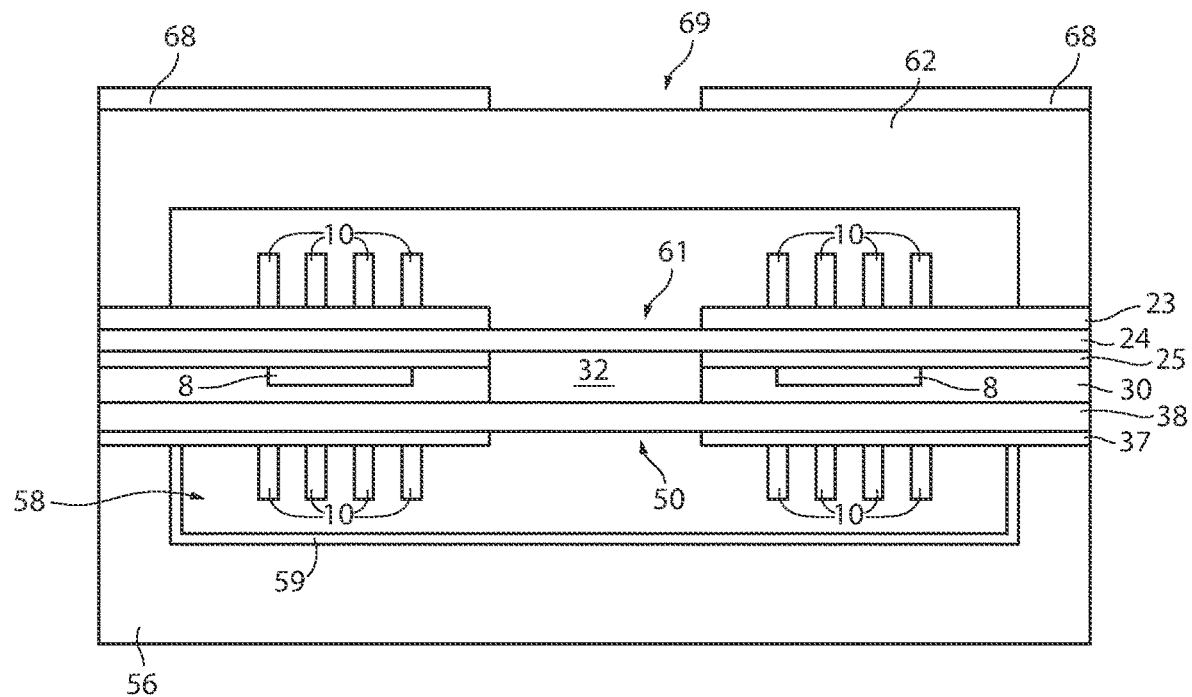
Figure 4S:
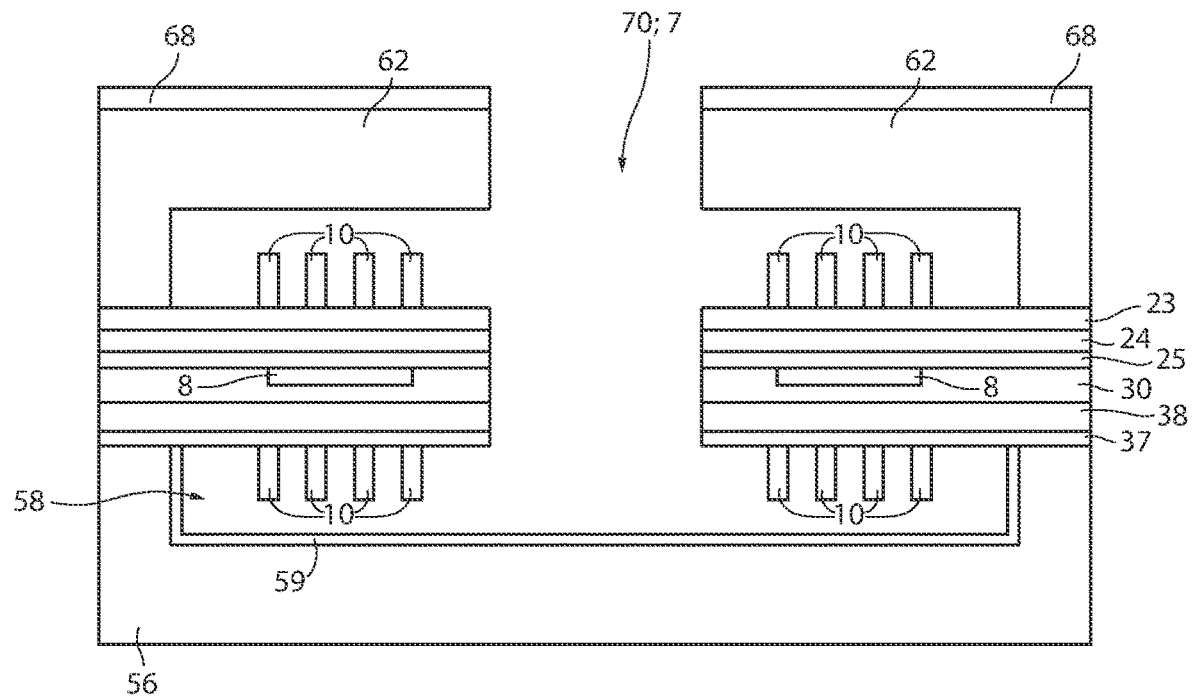

With reference to FIGS. 4A-4S there now follows a description of steps of a method of manufacturing the stator 1. FIGS. 4A-4S are represented in the same triaxial reference system X, Y, Z as that of FIG. 2 and illustrate, in cross-sectional view, the cross-section C-C of FIG. 1.

With reference to FIG. 4A, there are provided: a SOI (Silicon-On-Insulator) substrate 20, which includes a substrate 22 of semiconductor material, for example silicon; an intermediate layer 23 of insulating material, for example silicon oxide, which extends over the substrate 22; and a top layer 24 of semiconductor material, for example silicon, which extends over the intermediate layer 23.

A step of oxidation of the top layer 24 is then carried out to form a thin layer 25 of insulating material, for example silicon oxide. By way of example, the substrate 22 has a thickness in the range between 500 µm and 900 µm, the intermediate layer 23 has a thickness in the range between µm and 2 µm, the top layer 24 has a thickness in the range between 0.2 µm and 100 µm, and the layer 25 has a thickness in the range between 0.1 µm and 3.5 µm.

Then (FIG. 4B), a core layer made of a nickel-iron alloy (or some other compatible material) is formed, for example by deposition, and is then defined photolithographically (or by some other definition technique) to form the core 8 described previously. One core 8 is formed for each winding 3a-3c, 3a'-3c'. The shape and extension of the core 8 are defined in the design stage, according to the characteristics desired for the stator 1. For instance, the core 8 has a substantially rectangular shape with major side of a size such as to extend throughout the extension, along X, of the windings of the respective coil; for example, for a coil with two winding, the core 8 could have an extension along X of approximately 20 µm; for a coil with one hundred windings, the core 8 could have an extension of approximately 800 µm. The minor side of the core 8 has, for example, a size in the range between 20 µm and 500 µm. The thickness along Z of the core 8 is, for example, between 0.01 µm and 3 µm.

Then (FIG. 4C), an insulating layer 28 is formed, for example made of TEOS, on the layer and on the core 8; the TEOS layer 28 is then planarized so as to render the top surface thereof planar, preferably without exposing the core 8.

Next (FIG. 4D), a further deposition of an insulating layer 29 is carried out, for example a layer made of the same material as that of the layer 28 (here, TEOS), on the layer 28 and on the core 8. There is thus obtained a layer 30 (given by the sum of the layers 28 and 29) having a thickness (measured along Z alongside the core 8), for example, between 0.2 µm and 5 µm. In this step it is possible to form the conductive leads 5, as illustrated by way of example in FIGS. 9A-9C and described with reference to the above figures.

Then (FIG. 4E), the insulating layer 30 and the underlying layer 25 are selectively removed in a region where (as shown in subsequent steps) the central opening of the stator 1 in which to insert the rotor is to be formed. A trench 32 is thus formed having a circular shape and a diameter $d_r$, for example between 50 µm and 2000 µm. The trench 32 extends right through the layers 30 and 25, exposing a surface portion of the semiconductor layer 24.

Then (FIG. 4F), a wafer-to-wafer bonding is carried out for coupling, above the insulating layer 30, a further SOI wafer 35. The SOI wafer 35 includes: a substrate 36, made of semiconductor material, such as silicon; an intermediate layer 37, made of insulating material, for example silicon oxide, which extends over the substrate 36; and a top layer 38, made semiconductor material, such as silicon, which extends over the intermediate layer 37. Coupling with the insulating layer 30 is obtained at the top layer 38 of the SOI wafer 35. The trench 32 is thus closed to form a buried cavity (which is however denoted by the same reference number 32, for reasons of simplicity). Coupling is obtained by known fusion-bonding techniques.

Then (FIG. 4G), the substrate 36 of the SOI wafer 35 (which had, up to this step, the function of handle substrate) is completely removed, for example by a grinding or CMP process, or some other appropriate technology. The intermediate layer 37 is thus exposed.

Now steps are carried out for the formation of the conductive through vias 14, which are not visible in the cross-section of FIGS. 4A-4G so far described.

Reference will now be made to FIGS. 5A-5D, which illustrate by way of example the manufacturing steps for the formation of the conductive through vias 14. Formation of just one via 14 is shown; the present teaching applies to the simultaneous formation of all the conductive through vias 14.

Figure 5A:
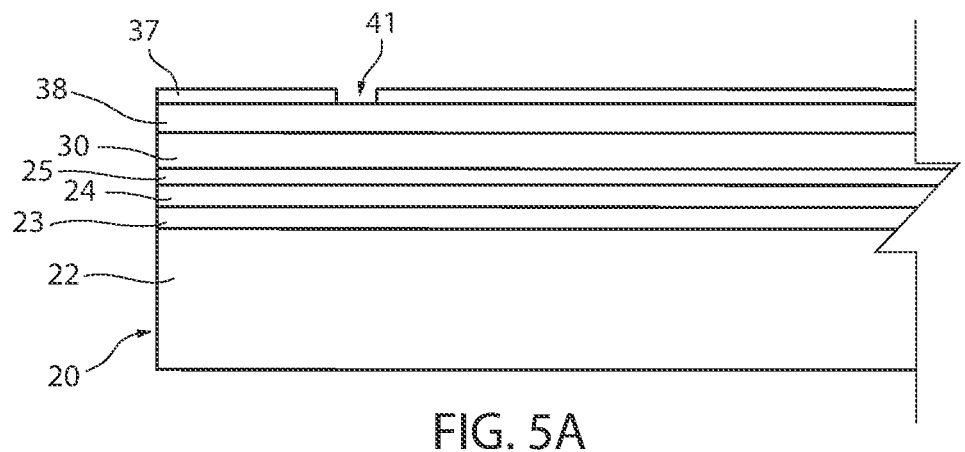
FIGS. 5A-5D illustrate, in cross-sectional view, steps for manufacturing conductive paths that are to form, in part, the coil of FIG. 2.
Figure 5B:
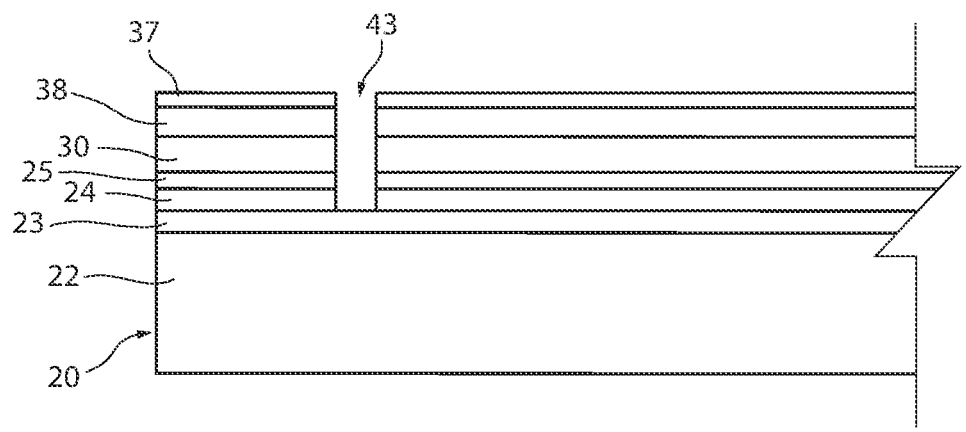
Figure 5C:
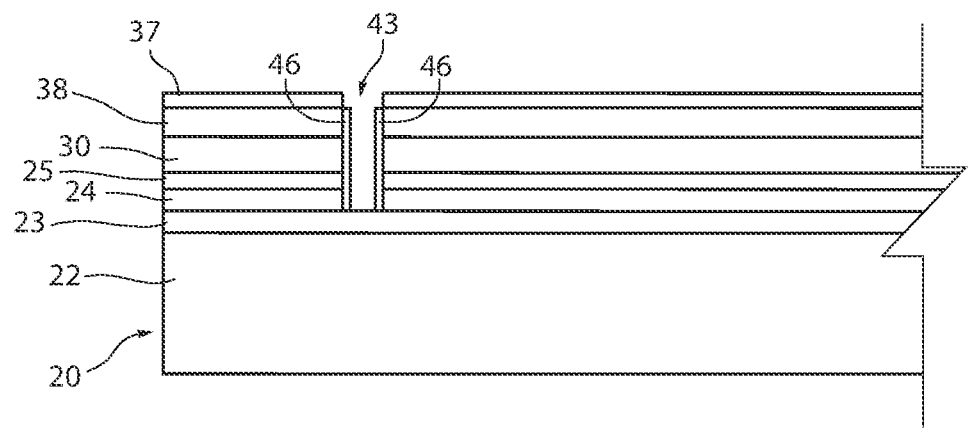

With reference to FIG. 5A, the intermediate layer 37 is selectively etched in the regions where the through vias 14 are to be formed. For this reason, a masked etch is used, with masking obtained by photolithographic techniques, to form a plurality of openings 41 (just one of which, as has been said, is shown in FIG. 5A) through which a surface portion of the semiconductor layer 38 is exposed.

Then (FIG. 5B), a plurality of etches are carried out (using appropriate etching chemistries according to the materials to be removed) at the openings 41 to remove in sequence the semiconductor layer 38 exposed through the opening 41, the insulating layer 30, the layer 25, and the semiconductor layer 24, thus exposing a surface portion of the intermediate layer 23. The trench 43 is in this way formed.

For formation of the trench 43 the same mask (not illustrated) used for formation of the opening 41 is, for example, used. By way of example, to remove the silicon of the layers 38 and 24 a dry etch is used with plasma containing, for example, $SF_6$, to remove the TEOS of the layer 30 a dry etch is used with plasma containing, for example, $CF_4$, and to remove the silicon oxide of the layers 37 and 25 a dry etch is used with plasma containing, for example, $CF_4$.

Then (FIG. 5C), a step of passivation of the inner side walls of the trench 43 is carried out, for example by laying an insulating layer 46, e.g., of silicon oxide, with a thickness (measured along the axis X) between 0.05 µm and 1 µm.

Then (FIG. 5D), formation of the through vias 14 is completed by filling the trenches 43 with conductive material 48, for example copper, via electrodeposition and planarization (these are here RDL interconnections). The conductive material 48 fills the trenches 43 completely up to the height (along Z) to which the surface the insulating layer 37 extends. The passivation layer 46 electrically insulates the conductive material 48 from the semiconductor layers 24 and 38.

Reference is now once again made to the cross-section C-C.

FIG. 4H represents a manufacturing step that follows formation of the conductive through vias 14 according to FIGS. 5A-5D.

With reference to FIG. 4H, the insulating layer 37 is selectively etched to form an opening substantially aligned, along Z, with the buried cavity 32. In top plan view, in the plane XY, the opening 50 has a circular shape and a diameter $d_r'$ equal to or greater than the diameter $d_r$. The openings 50 and 32 are concentric.

Then (FIG. 4I), the conductive strips 10 are formed at a first side of the core 8 (simultaneously for each winding 3a-3C and 3a'-3c'). The conductive strips 10 are formed above the insulating layer 37.

It is possible to use a typical process for formation (growth) of gold, in particular: deposition of a seed layer; photolithographic patterning of the seed layer to define the predefined shape (i.e., the shape defined in the design stage) of the conductive strips 10; and electrochemical deposition of gold.

The thickness along Z of each conductive strip is between 3 µm and 10 µm.

Then (FIG. 4L), a cap 56 is coupled on the insulating layer 37. The cap 56 has a cavity 58 of a size such as to contain completely the conductive strips 10 formed up to this processing step. Consequently, the regions of coupling of the cap to the layer 37 are external to the region where the conductive strips 10 (of all the windings 3a-3c, 3a'-3c') are present. Coupling is obtained by known techniques of permanent coupling between two silicon wafers, amongst which, for example, Au—Au metal bonding, bonding with glassfrit material, fusion bonding. The cap 56 is, for example, made of silicon and has, at the cavity 58, a protective layer 59 of a material that may be selectively removed from the material of the cap 56, for example silicon oxide in the case of a silicon cap 56. The protective layer 59 uniformly covers the walls of the cap 56 that define the cavity 58. Consequently, following upon the coupling step of FIG. 4L, the protective layer 59 faces the insulating layer 37 and the conductive strips 10.

With reference to FIG. 4M, a step of rotation of the body 20 and of the cap 56 is carried out to carry out machining steps at the substrate 22.

Next (FIG. 4N), the substrate 22 is completely removed, for example by a grinding or CMP step or some other appropriate technique. The intermediate layer 23 is thus exposed.

Then (FIG. 4O), the insulating layer 23 is etched to remove selective portions thereof, thus forming an opening 61 concentric to, and having the same size and shape as, the opening 50.

Figure 5D:
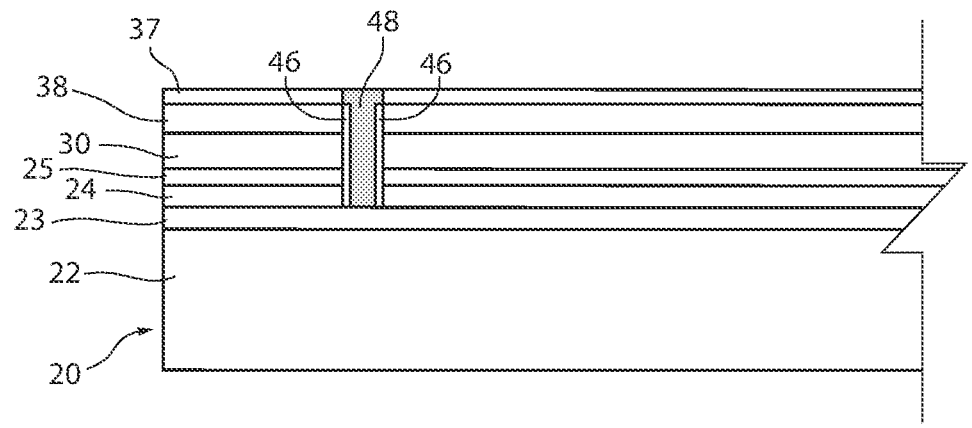

In this processing step, also a selective etch of the insulating layer 23 is carried out at the conductive through vias 14 formed in the step of FIG. 5D, to expose the conductive material 48 at the layer 23. This step is not illustrated in the figures.

Next (FIG. 4P), the conductive strips 10 are formed on the side of each core 8 opposite to the side where the conductive strips 10 have already been formed previously. The conductive strips formed in the step of FIG. 4P thus extend on the insulating layer 23. Formation of the aforesaid conductive strips 10 is obtained according to the same process described previously, which includes: deposition of a seed layer; photolithographically patterning of the seed layer to define the predefined shape (i.e., the shape defined in the design stage) of the conductive strips 10; and electrochemical deposition of gold.

The layer of gold extends over the layer 23 and within the openings made in the layer 23 in areas corresponding to the conductive through vias 14, reaching them and contacting them electrically.

Then (FIG. 4Q), a cap 62 is coupled to the insulating layer 23. The cap 62 has a cavity 64 of a size such as to contain completely the conductive strips 10 formed in the step of FIG. 4P (by symmetry, the opening 64 of the cap 62 corresponds to the opening 58 of the cap 56). Consequently, also the regions of coupling of the cap 62 to the layer 23 correspond to the regions of coupling of the cap 56 to the layer 37 and are external to the region where the conductive strips 10 (of all the windings 3a-3c, 3a'-3c') are present. The coupling is obtained by known techniques of fusion bonding. The cap 62 is, for example, made of silicon.

Next (FIG. 4R), an etching mask 68 is formed on the cap 62; the mask 68 has an opening 69 having the same shape (e.g., circular) and a size (in this example, the diameter) that is equal to or greater than the size (diameter) of the openings 50 and 61. The circular opening 69 is concentric to the circular openings 50 and 61.

Then (FIG. 4S), an etching step is carried out (e.g., dry etching, using for example $CF_4$ and $C_4F_8$ for removal of the oxides and $SF_6$ for removal of the silicon) at the cap 62 so as to remove completely portions thereof exposed through the opening 69 of the mask 68. Etching proceeds with complete removal of the portion of the semiconductor layer 38 exposed through the opening 61 and then the portion of the semiconductor layer 24 exposed through the cavity 32.

Since the etching chemistry is selective, the etch does not proceed by removing portions of the cap 56 in so far as the protective layer 59 functions as etch-stop layer.

The mask 68 may be removed or else kept to protect the cap 62.

According to an embodiment of the present disclosure, manufacture of the stator 1 is thus completed. The stator 1 of FIG. 4S has an opening 70 for insertion of the rotor that is of a non-through type.

To form a through opening, it is possible to envisage a corresponding opening in the protective layer 59 of the cap 56 (obtained during formation of the protective layer 59), and continue the etch of FIG. 4S up to complete removal of the material of the cap 56 exposed through the opening in the protective layer 59.

Figure 6:
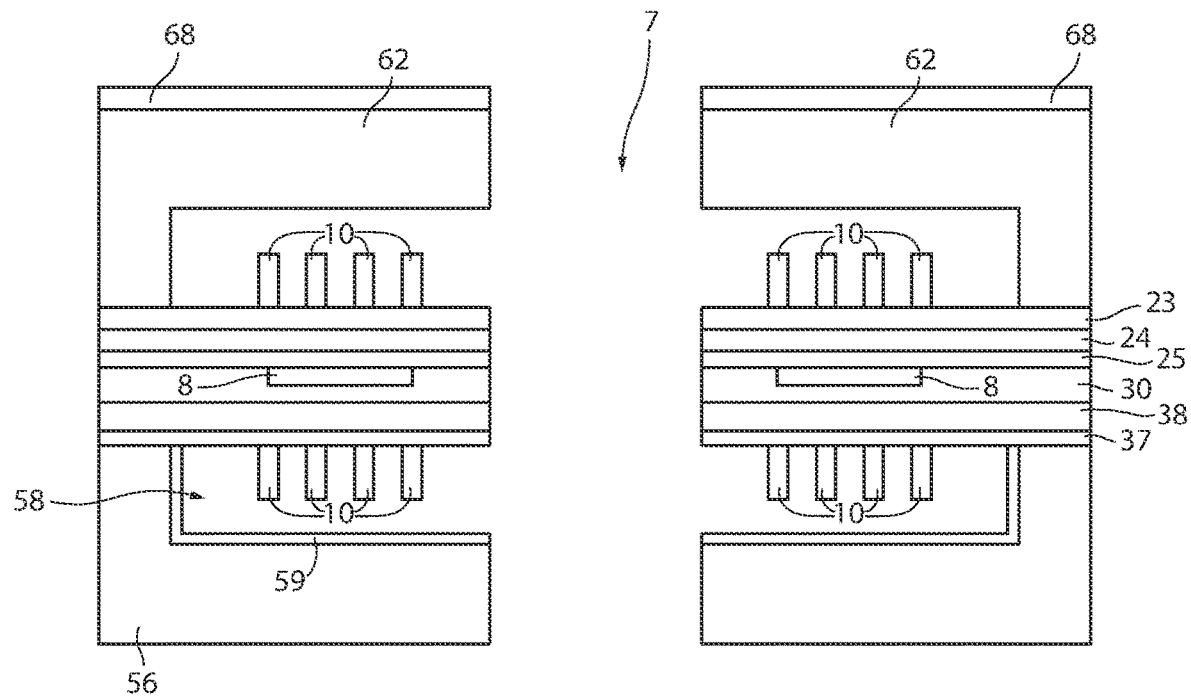
FIG. 6 shows, in cross-sectional view along the line of section C-C of FIG. 1, a stator according to an embodiment alternative to that of FIG. 4S.

In this case, the stator 1 of FIG. 6 is obtained, where the opening for insertion of the rotor is of a through type.

According to a further embodiment (illustrated in FIG. 7A), to strengthen the structure in the case of a through opening it is possible to shape the cap 56 in such a way that it has a protuberance 72 in the region of the cap 56 that, after the coupling described in FIG. 4L, is aligned to the opening 50. In this case, the protective layer 59 is not present where the cap 56 has to be selectively removed to create the through opening for the rotor. In other words, the protective layer 59 extends uniformly except for a portion of the protuberance 72 that, after coupling, is aligned to the opening 50. When the cap 56 is coupled to the rest of the structure, the protuberance 72 rests (by the protective layer 59) on the intermediate layer 37 alongside the opening 50 defined through the intermediate layer 37 and, in top plan view in the plane XY, covers the opening 50.

Figure 7A:
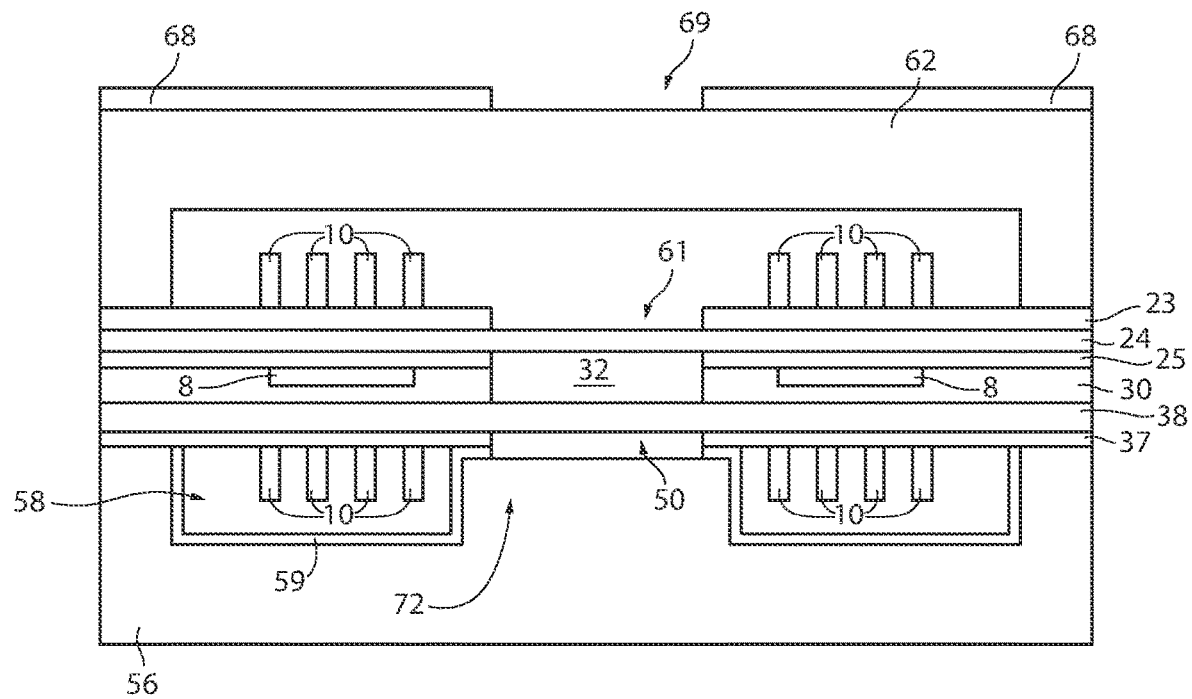
FIGS. 7A and 7B show, in cross-sectional view along the line of section C-C of FIG. 1, part of the steps for manufacturing the stator of FIG. 1 according to a further embodiment of the present disclosure.
Figure 7B:
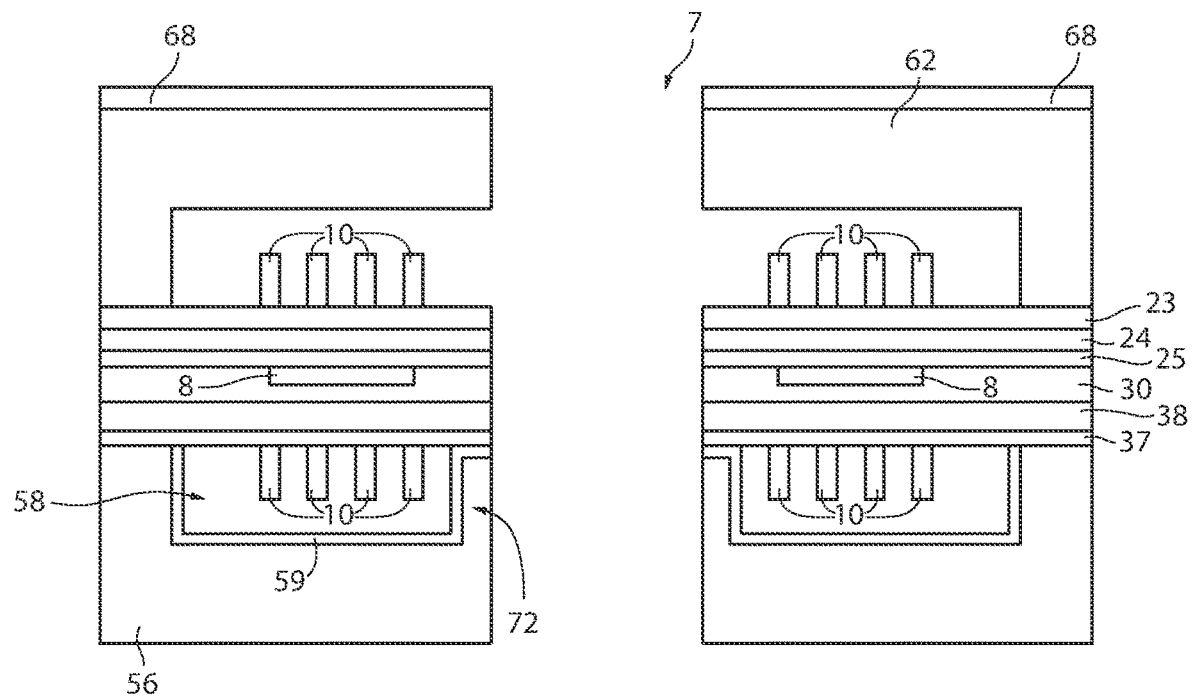

With reference to FIG. 7B, etching of the cap 62 and of the semiconductor layers 38 and 24 continues through the opening in the protective layer 59 by removing exposed portions of the protuberance 72 until a through opening is formed which traverses the cap 56 completely.

In use in a motor, the rotor may be inserted completely, through the stator, in the opening thus formed.

In a further embodiment (not illustrated), the etch of FIG. 7B is not carried out to form the through opening that traverses the cap 56 completely, but to form a non-through opening in the protuberance 72, which terminates within the cap 56. This embodiment, which is similar to the one described with reference to FIG. 4S, presents the advantage, as compared to that of FIG. 4S, of presenting a stronger structural support afforded by the presence of the protuberance 72.

FIGS. 8A-8F show an embodiment of a portion of the stator 1 that is alternative with respect to what has been described previously. In particular, FIGS. 8A-8F refer to a possible further embodiment of formation of the conductive through vias 14, in a way alternative to what is represented in FIGS. 5A-5D. FIGS. 8A-8F illustrate a portion of the stator 1, during intermediate manufacturing steps, limitedly to a region thereof in which there is present a conductive through via 14. The present teaching applies to simultaneous manufacture of all the conductive through vias and, more in general, to manufacture of remaining portions of the stator where there is interaction between manufacture of the conductive through vias 14 and the remaining parts of the stator 1.

Elements of the stator 1 common to the embodiment described previously are designated by the same reference numbers and are not described any further.

Figure 8A:
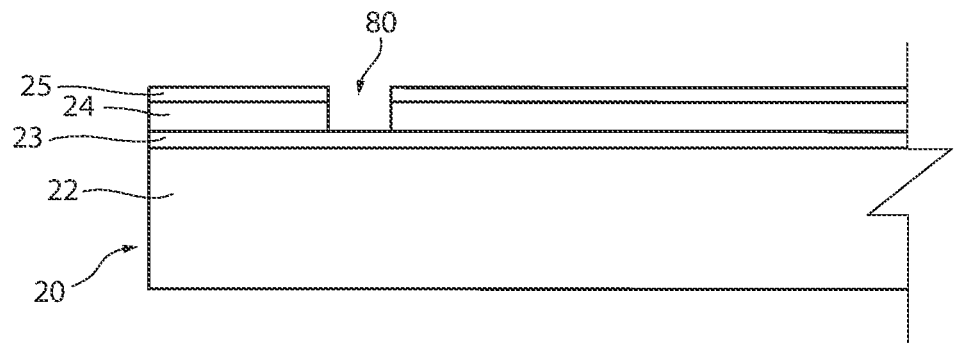
FIGS. 8A-8F illustrate, in cross-sectional view, steps for manufacturing conductive paths that are to form, in part, the coil of FIG. 2 according to an embodiment alternative to those of FIGS. 5A-5D.
Figure 8B:
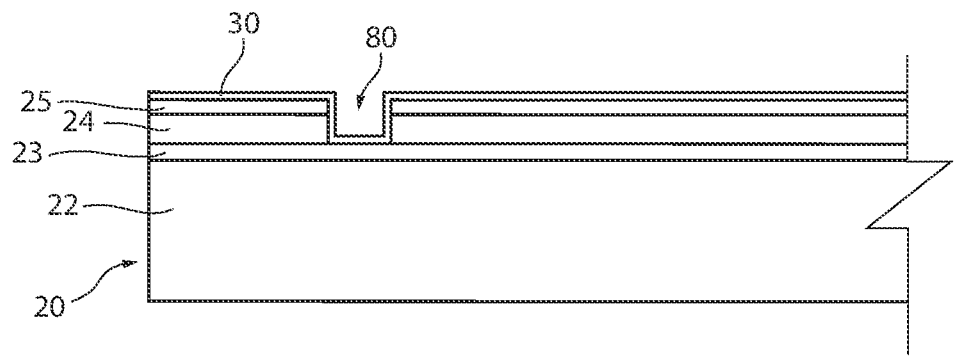

With reference to FIG. 8A, after provision of the SOI substrate 20 as in FIG. 4A and formation of the core 8 where the design calls for, as in FIG. 4B, an etch of the thin layer 25 and of the top layer 24 is carried out in the regions of the body 20 in which the through vias 14 are to be formed. An opening 80 is thus formed through which a surface portion of the intermediate layer 23 is exposed. The opening 80 has a shape, in top plan view in the plane XY, chosen between circular, oval, quadrangular, or generically polygonal, with a diameter between 10 μm and 200 μm.

Then (FIG. 8B), the step of formation of the layer 30 is carried out according to what has been described with reference to FIGS. 4C-4D. The layer 30 also penetrates into the opening made in the step of FIG. 8A, covering the side walls and the bottom thereof (without filling it completely). In a way not illustrated in the cross-sectional view of FIG. 8B, there is also formed the opening 32, according to what has been described in the case of FIG. 4E.

Figure 8C:
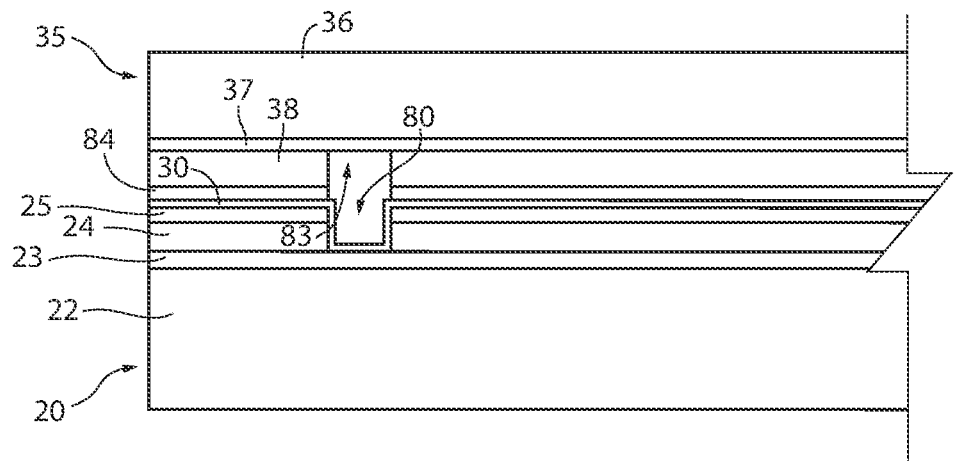
Figure 8D:
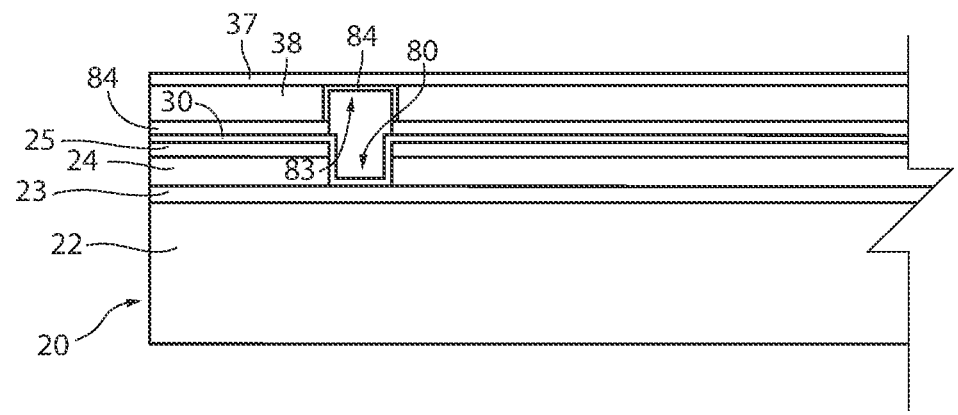

Then (FIG. 8C), the SOI substrate 35 is coupled in a way similar to what has been described with reference to FIG. 4F. In the embodiment of FIG. 8C, prior to the coupling step, the SOI substrate 35 is machined so as to form (e.g., by photolithographic and etching techniques) an opening 83 in the top layer 38; the opening 83 has a shape and a diameter corresponding to the shape and diameter of the opening 80. Next, a step of formation of an electrically insulating protective layer 84 is carried out (e.g., a layer of silicon oxide thermally grown or deposited) on the top layer 38 and on the inner walls and on the bottom of the opening 83. The protective layer 84 is selectively etched to expose a surface portion of the layer 38 in the region that, after coupling of the SOI wafers 20 and 35, directly faces the opening 35. In this way, as in FIG. 4F, the cavity 32 has on the top and underneath regions made of the same material (here silicon) to favor the subsequent etching steps for opening the central channel into which the rotor will be inserted.

Then (FIG. 8D), the substrate 36 is removed as in FIG. 4G, leaving the intermediate layer 37.

Figure 8E:
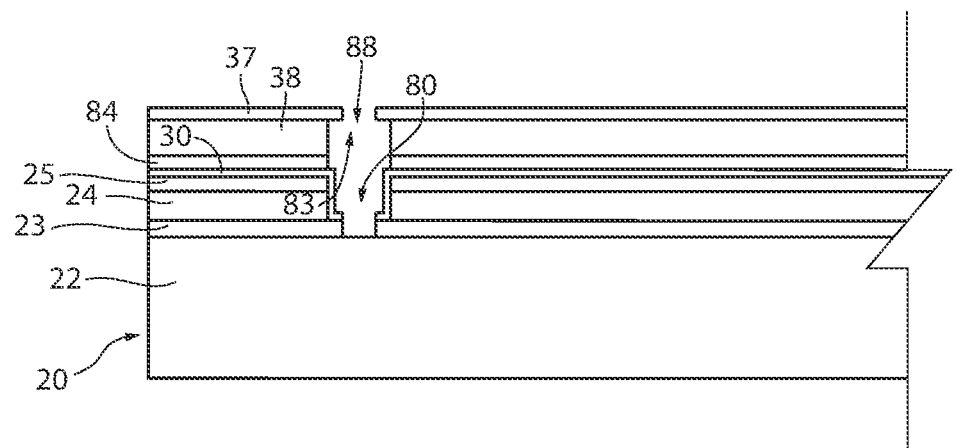
Figure 8F:
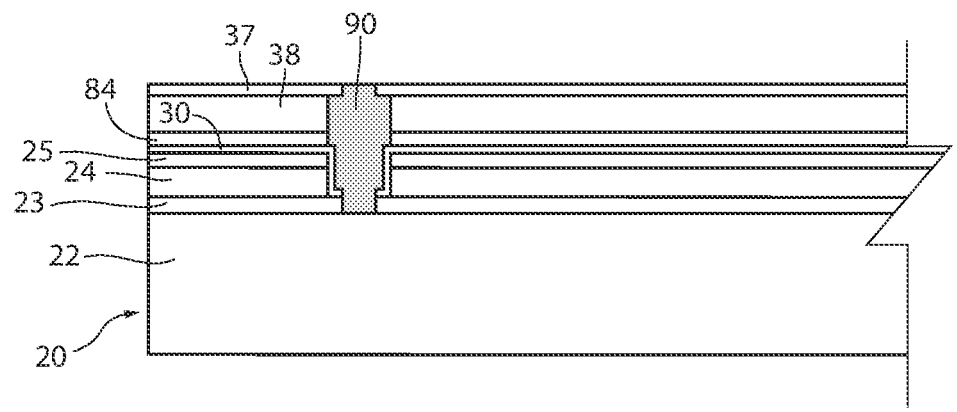

With reference to FIG. 8E, a step of successive etches is carried out to open a trench 88 in which subsequently (FIG. 8F) the conductive region of the through vias 14 is to be formed. The trench 88 is formed by etching the intermediate layer 37 at the cavities 80, 83. Since, in this embodiment, both of the layers 37 and 84 are made of the same material (silicon oxide), a single etch is sufficient to remove locally both of the layers 37 and 84. The etch then proceeds by removing the layer 30 thus exposed through the openings 80, 83 and likewise removing the intermediate layer 23. The etching chemistry used in the step of FIG. 8E is, for example, $CF_4$ or $C_4F_8$, which removes all the oxide layers considered.

Etching of the intermediate layer 23 may be omitted, or may be performed only in part. In this case, the layer 23 will in any case be removed to gain access to the conductive through via 14, as in the case of what has been described for the same step of FIG. 4O.

A step of filling of the trench 88 with conductive material, for example copper, is then carried out as described with reference to FIG. 5D, to form a conductive region 90 of the through via 14.

The subsequent steps for manufacturing the stator 1 are then carried out as described with reference to FIGS. 4H-4S.

The variants of FIGS. 7A-7B (as the other embodiments not illustrated but described) also apply to the embodiment of the stator 1 of FIGS. 8A-8F.

Figure 9A:
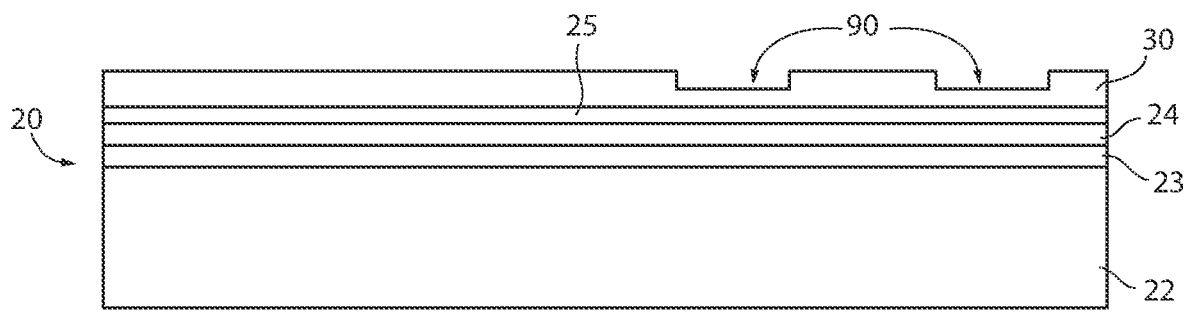
FIGS. 9A-9C show, in cross-sectional view, intermediate steps for formation of electrical-connection paths designed to supply a current signal to the coils of the stator of FIG. 1.
Figure 9B:
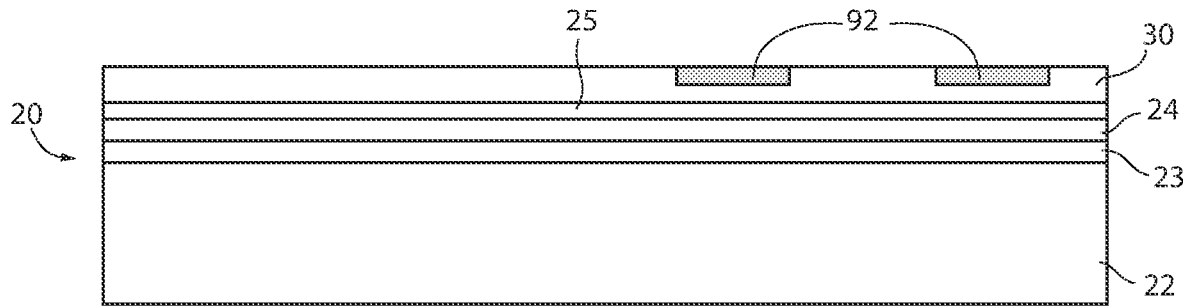

Manufacture of the conductive leads 5 does not in itself form part of the present disclosure, and these may be obtained in a known way. For instance, as illustrated in FIG. 9A, the conductive leads 5 may be formed following upon the step of formation of the layer 30 by removing selective regions of the layer 30 for a thickness of the layer 30 that is, for example, equal to or smaller than the thickness of the layer 29. This step defines the shape and extension of paths 91 of the leads 5.

Then (FIG. 9B), a step is carried out of filling the paths 91 formed in this intermediate step with conductive material 92, for example copper.

Figure 9C:
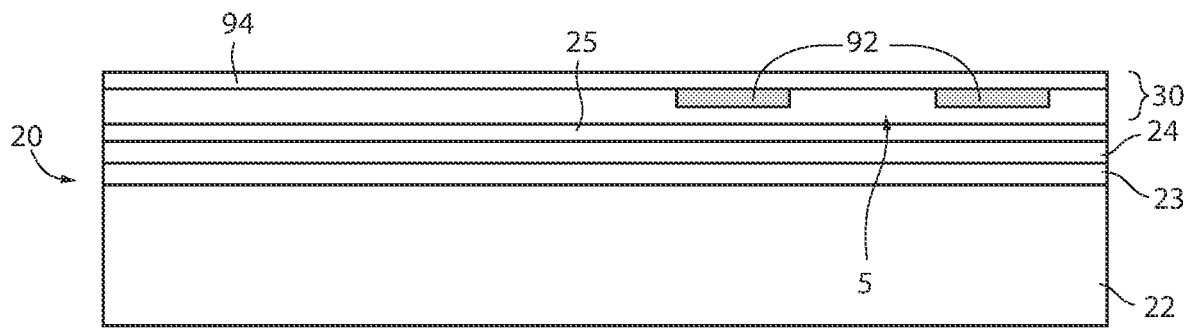

A further step of deposition of a layer 94, made of the same material (e.g., TEOS) as the layer 29, covers the conductive material 92, burying the conductive leads 5, as illustrated in FIG. 9C. The layers stacked on top of one another 28, 29 and 94 are in any case designated as a whole by the reference number 30, for simplicity and uniformity with the foregoing description, which is not modified by the presence of the conductive leads buried in the layer 30.

To gain access to the conductive leads, it is sufficient, in a per se known manner, to make a hole through the layers that cover the conductive leads, in regions prearranged for electrical access to the conductive leads 5.

Figure 10A:
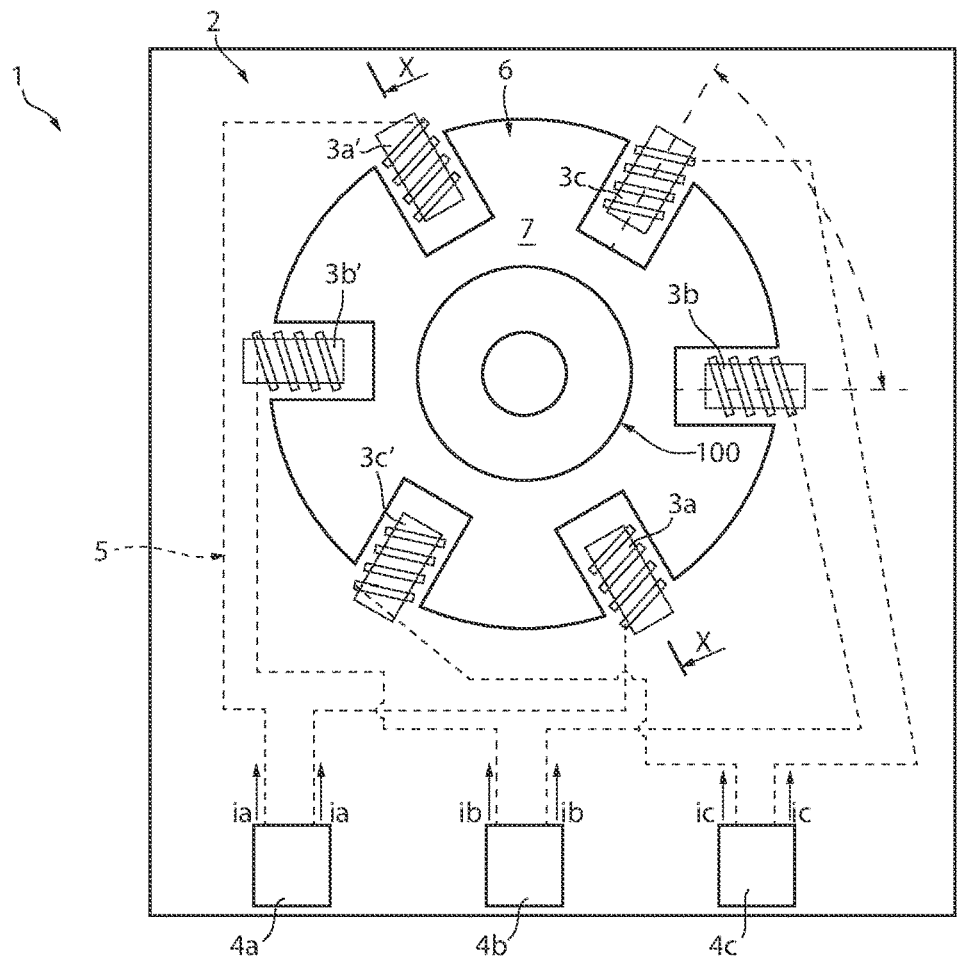
FIGS. 10A and 10B show in top plan view and in cross-sectional view, respectively, a three-phase asynchronous electric motor including the stator according to the present disclosure and a rotor.

FIG. 10A is a schematic illustration, in top plan view in the plane XY, of a portion of a three-phase asynchronous motor including the stator 1 according to the present disclosure and a rotor 100 inserted in the hole 7 of the stator 1.

Figure 10B:
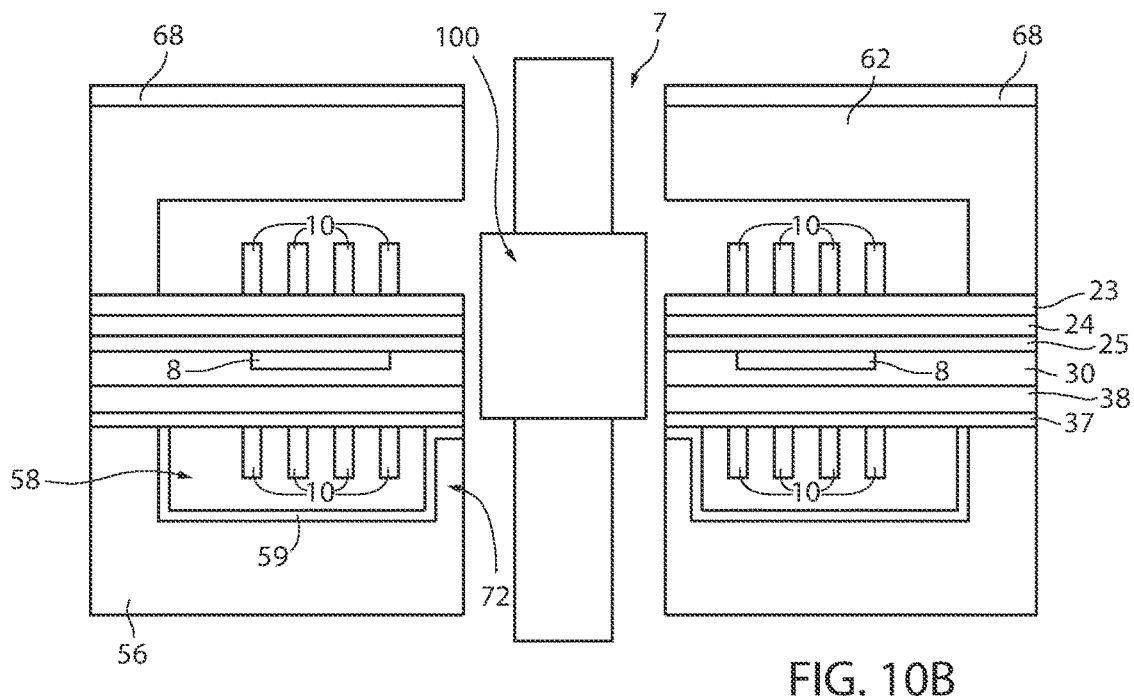

FIG. 10B is a cross-sectional view along the line of section X-X of the portion of the three-phase asynchronous motor of FIG. 10A. FIG. 10B is, merely by way of example, based upon FIG. 7B. However, the teaching of FIG. 10B applies, with evident adaptations, to all the embodiments described according to the present disclosure.

From an examination of the characteristics of the disclosure described and illustrated herein the advantages that it affords are evident.

In particular, the stator described previously is obtained according to manufacturing steps already available in the context of manufacture of semiconductor devices and systems, in a miniaturized and economically advantageous way.

Finally, it is clear that modifications and variations may be made to the disclosure described and illustrated herein, without thereby departing from the scope of the present disclosure.

For instance, it is possible to omit formation of one, some, or all of the openings 32 (FIG. 4E), 50 (FIG. 4H) and 61 (FIG. 4O), and remove the respective layers of insulating material during the step of FIG. 4A. In this case, it is expedient to use etching chemistries different from one another for removal of the silicon layers 24, 38 and for removal of the layers of silicon oxide/TEOS 23, 25, 30, 37. It is likewise expedient to use an etch with appropriate directionality (along Z) to prevent removal of structural regions of the stator 1, which extend laterally with respect to the region where the hole 7 is to be formed.

In particular, the present disclosure has been described with explicit reference to a three-phase asynchronous motor;

however, the present teaching applies to manufacture of a stator for a different type of motor or actuator, for example of a single-phase synchronous type, a single-phase asynchronous type, a three-phase synchronous type, etc.

A method of manufacturing a stator (1) for an electrical actuator, may be summarized as including the steps of providing a first body (20) including a first semiconductor layer (24), a first structural layer (25) on a first side of the first semiconductor layer (24), and a second structural layer (23) on a second side, opposite to the first side, of the first semiconductor layer (24), wherein the first and second structural layers are made of a material that is selectively removable with respect to the material of the first semiconductor layer (24); forming, on the first structural layer (25), a ferromagnetic core region (8); covering the core region (8) with a protective dielectric layer (30); providing a second body (35) including a second semiconductor layer (38) on a third structural layer (37), wherein the third structural layer is made of a material that is selectively removable with respect to the material of the second semiconductor layer (38); coupling the second semiconductor layer (38) of the second body (35) to the protective dielectric layer (30); forming a plurality of conductive through vias (15) through the first and second semiconductor layers (24, 38) and through the first and third semiconductor layers (25, 37); forming, on the third structural layer (37) in a position corresponding to and above a first side of the core region (8), a first plurality of conductive strips (10) parallel to one another and in electrical contact with the plurality of conductive through vias (15); coupling a first protective cap (56) at the third structural layer (37), the first protective cap (56) having a cavity (58) designed to house the first plurality of conductive strips (10); forming, on the second structural layer (23) in a position corresponding to and above a second side, opposite to the first side, of the core region (8), a second plurality of conductive strips (10) parallel to one another and in electrical contact with the plurality of conductive through vias (15) by conductive paths through the second structural layer (23); coupling a second protective cap (62) to the second structural layer (23), the second protective cap (62) having a respective cavity (64) designed to house the second plurality of conductive strips (10); etching a selective portion of the second protective cap (62), which extends laterally with respect to the first and second pluralities of conductive strips (10) to form a through opening passing through the second protective cap (62); and forming a hole (70, 7) through the first and second structural bodies (20, 35) by removing selective portions of the first and second bodies (20, 35) that are aligned, in a direction (Z), to the through opening.

The steps of forming the first plurality of conductive strips (10), the plurality of conductive through vias (15), and the second plurality of conductive strips (10) may include electrically coupling the first and second pluralities of conductive strips (10) to the plurality of conductive through vias (15) so as to form an electrical path that implements a winding or coil around the core region (8).

The method may further include the step of removing selective portions of the first, second, and third structural layers (25, 23, 37) and of the protective dielectric layer (30) at portions thereof where the hole (70, 7) is to be formed, said step of continuing the etch may include removing the first and second semiconductor layers exposed through the first, second, and third structural layers (25, 23, 37) and through the protective dielectric layer (30).

The method may further include the step of etching a selective portion of the first protective cap (56) aligned, in the direction (Z), with the through opening passing through the second protective cap (62) and the hole (70, 7).

The step of forming the plurality of conductive through vias (15) may include: after the step of coupling the second semiconductor layer (38) to the protective dielectric layer (30), forming a respective plurality of trenches (43) through the first and second semiconductor layers (24, 38) and through the first and third semiconductor layers (25, 37); forming a respective plurality of insulating layers (46) within each trench (43) to cover portions of the first and second semiconductor layers (24, 38) exposed within each trench (43); and filling each trench (43) with conductive material.

The step of forming the plurality of conductive through vias (15) may include, prior to the step of coupling the second semiconductor layer (38) to the protective dielectric layer (30) forming a respective plurality of first trenches (80) through the first semiconductor layer (24) and through the first structural layer (25) according to an arrangement pattern; uniformly covering inner walls of each first trench (80) with the protective dielectric layer (30); forming a respective plurality of second trenches (83) through the second semiconductor layer (38), according to the arrangement pattern; and uniformly covering inner walls of each second trench (83) with an insulating layer (84), wherein the step of coupling the second semiconductor layer (38) to the protective dielectric layer (30) may include aligning, in the direction (Z), each first trench (80) with a respective second trench (83), and the step of forming the plurality of conductive through vias (15) may further include, after the step of coupling the second semiconductor layer (38) to the protective dielectric layer (30) removing selective portions of the third structural layer (37) and of the insulating layer (84) that are vertically aligned, in the direction (Z), with each second trench (83); optionally, removing completely or in part the second structural layer (23); and filling each first and second trench (80, 83) with conductive material.

The first protective cap (56) may have a protuberance (72) inside the cavity (58), which extends in the direction (Z), the step of coupling the first protective cap (56) to the third structural layer (37) may include coupling the protuberance (72) to the third structural layer (37) laterally with respect to the first and second pluralities of conductive strips (10), the method may further include the step of removing portions of the protuberance (72) exposed through the hole (70, 7) to form an opening in part or right through the first protective cap (56).

The first, second, and third structural layers may be made of electrically insulating material.

A stator (1) for an electrical actuator, may be summarized as including a solid body (20; 35) including layers of semiconductor material (24, 38) arranged between a first layer of insulating material (23) and a second layer of insulating material (37); a ferromagnetic core region (8) between the layers of semiconductor material (24, 38), electrically insulated from the layers of semiconductor material (24, 38); a plurality of conductive through vias (15) through the solid body (20; 35); a first plurality of conductive strips (10) on the first layer of insulating material (23), which extend parallel to one another in positions corresponding to and above a first side of the core region (8); a second plurality of conductive strips (10) on the second layer of insulating material (37), which extend parallel to one another in positions corresponding to and above a second side, opposite to the first side, of the core region (8), wherein the first plurality of conductive strips (10), the plurality of conductive through vias (15), and the second plurality of conductive strips (10) are electrically connected together to form a coil wound around the core region (8); a first protective cap (56) coupled to the second layer of insulating material (37) and provided with a cavity (58) that is to house the first plurality of conductive strips (10); a second protective cap (62) coupled to the first layer of insulating material (23) and provided with a respective cavity (64) that is to house the second plurality of conductive strips (10); and a hole (70, 7) passing through at least one between the first protective cap and the second protective cap and through the first and second solid bodies, alongside the coil.

The stator may include a number of coils equal to three or a multiple of three.

An electric actuator or motor may be summarized as including a stator.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of manufacturing a stator for an electrical actuator, comprising:
    providing a first body including a first semiconductor layer, a first structural layer on a first side of the first semiconductor layer, and a second structural layer on a second side, opposite to the first side, of the first semiconductor layer, wherein the first and second structural layers are made of a material that is selectively removable with respect to a material of the first semiconductor layer;
    forming, on the first structural layer, a ferromagnetic core region;
    covering the core region with a protective dielectric layer;
    providing a second body including a second semiconductor layer on a third structural layer, wherein the third structural layer is made of a material that is selectively removable with respect to a material of the second semiconductor layer;
    coupling the second semiconductor layer of the second body to the protective dielectric layer;
    forming a plurality of conductive through vias through the first and second semiconductor layers and through the first and third structural layers;
    forming, on the third structural layer in a position corresponding to and above a first side of the core region, a first plurality of conductive strips parallel to one another and in electrical contact with the plurality of conductive through vias;
    coupling a first protective cap at the third structural layer, the first protective cap having a cavity designed to house the first plurality of conductive strips;
    forming, on the second structural layer in a position corresponding to and above a second side, opposite to the first side, of the core region, a second plurality of conductive strips parallel to one another and in electrical contact with the plurality of conductive through vias by conductive paths through the second structural layer;
    coupling a second protective cap to the second structural layer, the second protective cap having a respective cavity designed to house the second plurality of conductive strips;
    etching a selective portion of the second protective cap extending laterally with respect to the first and second pluralities of conductive strips to form a through opening passing through the second protective cap; and
    forming a hole through the first and second bodies by removing selective portions of the first and second bodies that are aligned, in a direction, to the through opening.

2. The method according to claim 1, wherein the steps of forming the first plurality of conductive strips, the plurality of conductive through vias, and the second plurality of conductive strips includes electrically coupling the first and second pluralities of conductive strips to the plurality of conductive through vias so as to form an electrical path that implements a winding or coil around the core region.

3. The method according to claim 1, further comprising the step of removing selective portions of the first, second, and third structural layers and of the protective dielectric layer at portions thereof where the hole is to be formed, the step of continuing the etch including removing the first and second semiconductor layers exposed through the first, second, and third structural layers and through the protective dielectric layer.

4. The method according to claim 1, further comprising the step of etching a selective portion of the first protective cap aligned with the through opening passing through the second protective cap and the hole.

5. The method according to claim 1, wherein the step of forming the plurality of conductive through vias includes:
    after the step of coupling the second semiconductor layer to the protective dielectric layer, forming a respective plurality of trenches through the first and second semiconductor layers and through the first and third semiconductor layers;
    forming a respective plurality of insulating layers within each trench to cover portions of the first and second semiconductor layers exposed within each trench; and
    filling each trench with conductive material.

6. The method according to claim 1, wherein the step of forming the plurality of conductive through vias includes, prior to the step of coupling the second semiconductor layer to the protective dielectric layer:
    forming a respective plurality of first trenches through the first semiconductor layer and through the first structural layer according to an arrangement pattern;
    uniformly covering inner walls of each first trench with the protective dielectric layer;
    forming a respective plurality of second trenches through the second semiconductor layer, according to the arrangement pattern; and
    uniformly covering inner walls of each second trench with an insulating layer,
    wherein the step of coupling the second semiconductor layer to the protective dielectric layer includes aligning, in the direction, each first trench with a respective second trench,
    and wherein the step of forming the plurality of conductive through vias further includes, after the step of coupling the second semiconductor layer to the protective dielectric layer:
    removing selective portions of the third structural layer and of the insulating layer that are vertically aligned with each second trench;
    removing completely or in part the second structural layer; and
    filling each first and second trench with conductive material.

7. The method according to claim 1, wherein the first protective cap has a protuberance inside the cavity, which extends in the direction,
the step of coupling the first protective cap to the third structural layer including coupling the protuberance to the third structural layer laterally with respect to the first and second pluralities of conductive strips, the method further comprising the step of removing portions of the protuberance exposed through the hole to form an opening in part or right through the first protective cap.

8. The method according to claim 1, wherein the first, second, and third structural layers are made of electrically insulating material.

9. A stator for an electrical actuator, comprising:
a solid body including layers of semiconductor material arranged between a first layer of insulating material and a second layer of insulating material;
a ferromagnetic core region between the layers of semiconductor material, electrically insulated from the layers of semiconductor material;
a plurality of conductive through vias through the solid body;
a first plurality of conductive strips on the first layer of insulating material, which extend parallel to one another in positions corresponding to and above a first side of the core region;
a second plurality of conductive strips on the second layer of insulating material, which extend parallel to one another in positions corresponding to and above a second side, opposite to the first side, of the core region, wherein the first plurality of conductive strips, the plurality of conductive through vias, and the second plurality of conductive strips are electrically connected together to form a coil wound around the core region;
a first protective cap coupled to the second layer of insulating material and provided with a cavity that is to house the first plurality of conductive strips;
a second protective cap coupled to the first layer of insulating material and provided with a respective cavity that is to house the second plurality of conductive strips; and
a hole passing through at least one between the first protective cap and the second protective cap and through the first and second solid bodies, alongside the coil.

10. The stator according to claim 9, comprising a number of coils equal to three or a multiple of three.

11. The stator according to claim 9, wherein the first protective cap has a protuberance inside the cavity.

12. A method, comprising:
forming a solid body including a first semiconductor layer between a first structural layer and second structure layer selectively etchable with respect to the first semiconductor layer;
forming a ferromagnetic core region on the first structural layer;
covering the core region with a protective dielectric layer;
coupling a second semiconductor layer to the protective dielectric layer;
forming a plurality of conductive through vias through the first and second semiconductor layers, the first structural layer, and a third structural layer coupled to the second semiconductor layer;
forming, on the third structural layer in a position corresponding to and above a first side of the core region, a first plurality of conductive strips parallel to one another and in electrical contact with the plurality of conductive through vias; and
coupling a first protective cap at the third structural layer, the first protective cap having a cavity designed to house the first plurality of conductive strips.

13. The method of claim 12, comprising:
forming, on the second structural layer in a position corresponding to and above a second side, opposite to the first side, of the core region, a second plurality of conductive strips parallel to one another and in electrical contact with the plurality of conductive through vias by conductive paths through the second structural layer; and
coupling a second protective cap to the second structural layer, the second protective cap having a respective cavity designed to house the second plurality of conductive strips.

14. The method of claim 13, comprising:
etching a selected portion of the second protective cap extending laterally with respect to the first and second pluralities of conductive strips to form a through opening passing through the second protective cap; and
forming a hole through the first and second bodies by removing selective portions of the first and second bodies that are aligned, in a direction, to the through opening.

15. The method of claim 14, wherein forming the plurality of conductive through vias includes, prior to coupling the second semiconductor layer to the protective dielectric layer:
forming a respective plurality of first trenches through the first semiconductor layer and through the first structural layer according to an arrangement pattern;
uniformly covering inner walls of each first trench with the protective dielectric layer;
forming a respective plurality of second trenches through the second semiconductor layer, according to the arrangement pattern; and
uniformly covering inner walls of each second trench with an insulating layer.

16. The method of claim 15, wherein coupling the second semiconductor layer to the protective dielectric layer includes aligning, in the direction, each first trench with a respective second trench.

17. The method of claim 16, wherein forming the plurality of conductive through vias further includes, after coupling the second semiconductor layer to the protective dielectric layer:
removing selective portions of the third structural layer and of the insulating layer that are vertically aligned with each second trench;
removing completely or in part the second structural layer; and
filling each first and second trench with conductive material.

18. The method of claim 12, wherein forming the first plurality of conductive strips, the plurality of conductive through vias, and a second plurality of conductive strips includes electrically coupling the first and second pluralities of conductive strips to the plurality of conductive through vias to form an electrical path that implements a winding or coil around the core region.

19. The method of claim 12, further comprising removing selected portions of the first, second, and third structural layers and of the protective dielectric layer at portions thereof where a hole is to be formed, where continuing the etch includes removing the first and second semiconductor layers exposed through the first, second, and third structural layers and through the protective dielectric layer.

20. The method according to claim 12, further comprising the etching a selected portion of the first protective cap aligned with the through opening passing through a second protective cap and a hole.

* * * * *